(12) United States Patent
Peleckas et al.

(10) Patent No.: US 11,619,312 B2
(45) Date of Patent: *Apr. 4, 2023

(54) REVOLVER BYPASS VALVE

(71) Applicant: Mueller International, LLC, Atlanta, GA (US)

(72) Inventors: Tomas Peleckas, Decatur, IL (US); Timothy Wayne Stern, Hixson, TN (US)

(73) Assignee: Mueller International, LLC, Atlanta, GA (US)

( * ) Notice: Subject to any disclaimer, the term of this patent is extended or adjusted under 35 U.S.C. 154(b) by 67 days.

This patent is subject to a terminal disclaimer.

(21) Appl. No.: 17/149,439

(22) Filed: Jan. 14, 2021

(65) Prior Publication Data
US 2022/0221070 A1 Jul. 14, 2022

(51) Int. Cl.
*F16K 11/074* (2006.01)
*G01F 15/18* (2006.01)
*G01F 15/00* (2006.01)

(52) U.S. Cl.
CPC ........ *F16K 11/0743* (2013.01); *G01F 15/005* (2013.01); *G01F 15/185* (2013.01)

(58) Field of Classification Search
CPC ... F16K 11/0743; G01F 15/005; G01F 15/185
USPC ......................... 137/15.03, 315.06
See application file for complete search history.

(56) References Cited

U.S. PATENT DOCUMENTS

| | | |
|---|---|---|
| 2,579,656 A | 12/1951 | Douglas et al. |
| 2,632,328 A | 3/1953 | McChesney |
| 3,238,969 A | 3/1966 | Champion |
| 3,289,696 A | 12/1966 | Champion |
| 3,387,632 A * | 6/1968 | Grove .................. G01F 15/005 251/367 |
| 4,602,657 A | 7/1986 | Anderson, Jr. et al. |
| 4,786,409 A | 11/1988 | Miller |
| 4,821,772 A | 4/1989 | Anderson, Jr. et al. |
| 7,347,219 B2 | 3/2008 | Gohde et al. |

(Continued)

OTHER PUBLICATIONS

Huffman, Jeffrey Allen; Final Office Action for U.S. Appl. No. 16/887,922, filed May 29, 2020, dated May 17, 2022, 18 pgs.

(Continued)

*Primary Examiner* — Michael R Reid
(74) *Attorney, Agent, or Firm* — Taylor English Duma LLP

(57) ABSTRACT

A bypass valve includes a base defining a base sealing surface, the base defining a upstream utility bore, a downstream utility bore, a meter inlet bore, and a meter outlet bore each extending into the base sealing surface; and a selector defining a selector sealing surface positioned in sealing engagement with the base sealing surface, the selector defining a primary passage and a secondary passage, the selector defining at least one primary passage bore extending into the selector sealing surface and connecting in fluid communication with the primary passage, the selector defining at least one secondary passage bore extending into the selector sealing surface and connecting in fluid communication with the secondary passage, the selector being rotatable relative to the base about and between a meter position and a bypass position, the selector connecting the upstream utility bore in fluid communication with the meter inlet bore in the meter position.

21 Claims, 14 Drawing Sheets

(56) References Cited

U.S. PATENT DOCUMENTS

| | | |
|---|---|---|
| 10,247,594 B2 | 4/2019 | Smith et al. |
| 11,555,547 B2 | 1/2023 | Peleckas et al. |
| 2005/0022872 A1 | 2/2005 | Robison |
| 2007/0089791 A1 | 4/2007 | Gohde et al. |
| 2013/0263951 A1 | 10/2013 | Gardner |
| 2018/0313682 A1 | 11/2018 | Smith et al. |
| 2018/0372235 A1 | 12/2018 | Smith |
| 2020/0149945 A1 | 5/2020 | Yaklin |
| 2021/0207986 A1 | 7/2021 | Smith et al. |
| 2021/0372534 A1 | 12/2021 | Huffman |
| 2022/0221068 A1* | 7/2022 | Peleckas ............. F16K 11/0743 |

OTHER PUBLICATIONS

Peleckas, Tomas; Non-Final Office Action for U.S. Appl. No. 17/149,369, filed Jan. 14, 2021, dated Jun. 1, 2022, 27 pgs.

Huffman, Jeffrey Allen; Non-Final Office Action for U.S. Appl. No. 16/887,922, filed May 29, 2020, dated Nov. 15, 2021, 33 pgs.

Huffman, Jeffrey Allen; Advisory Action for U.S. Appl. No. 16/887,922, filed May 29, 2020, dated Aug. 9, 2022, 4 pgs.

Huffman, Jeffrey Allen; Non-Final Office Action for U.S. Appl. No. 16/887,922, filed May 29, 2020, dated Oct. 13, 2022, 25 pgs.

Peleckas, Tomas; Applicant-Initiated Interview Summary for U.S. Appl. No. 17/419,369, filed Jan. 14, 2021, dated Aug. 29, 2022, 2 pgs.

Peleckas, Tomas; Notice of Allowance for U.S. Appl. No. 17/149,369, filed Jan. 14, 2021, dated Sep. 15, 2022, 11 pgs.

Huffman, Jeffrey Allen; Final Office Action for U.S. Appl. No. 16/887,922, filed May 29, 2020, dated Jan. 20, 2023, 16 pgs.

* cited by examiner

REVOLVER BYPASS VALVE

TECHNICAL FIELD

This disclosure relates to valves. More specifically, this disclosure relates to a bypass valve for utility meters.

BACKGROUND

In many areas, public utilities pipe various fluids directly to homes, businesses, and other establishments. Common utility fluids include liquids, such as water, and gases, such as natural gas. These fluids are commonly distributed by large infrastructure networks, and a meter is positioned at each point of consumption, such as a home, business, or other establishment, to monitor how much the location consumes. The meters are commonly positioned directly inline on branched piping coming off of a main infrastructure pipeline.

If an inline meter needs to be taken out of service for any reason, the utility flow to the point of consumption must be interrupted while the meter is physically disconnected from the upstream and downstream piping. During this period, the affected point of consumption will not have access to the utility product carried by that line. Disrupting service of a natural gas line also poses additional problems. Many gas-powered appliances, such as water heaters or fire places, have a pilot light that stays on at all times during normal operation. If the flow of natural gas is disrupted to the point of consumption, the pilot lights will go out. If the flow of natural gas is resumed to the point of consumption and the pilot light is not turned off or relit, natural gas will flow out of the appliance through the unlit pilot light, and the natural gas can accumulate indoors. This accumulation of gas can cause fire and explosion risks. Accordingly, the flow of natural gas to the point of consumption cannot be cut off and later resumed without having access to the appliances indoors, which can make the servicing of utility meters difficult to plan for utility companies because they must coordinate with the customer to provide access to the affected appliances.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a bypass valve comprising a base defining a base sealing surface, the base defining a upstream utility bore, a downstream utility bore, a meter inlet bore, and a meter outlet bore each extending into the base sealing surface; and a selector defining a selector sealing surface positioned in sealing engagement with the base sealing surface, the selector defining a primary passage and a secondary passage, the selector defining at least one primary passage bore extending into the selector sealing surface and connecting in fluid communication with the primary passage, the selector defining at least one secondary passage bore extending into the selector sealing surface and connecting in fluid communication with the secondary passage, the selector being rotatable relative to the base about and between a meter position and a bypass position, the selector connecting the upstream utility bore in fluid communication with the meter inlet bore in the meter position, the selector connecting the upstream utility bore in fluid communication with the downstream utility bore in the bypass position.

Also disclosed is a utility metering system comprising an upstream utility line; a downstream utility line; a meter comprising a meter inlet and a meter outlet, the meter configured to measure a fluid flow through the meter; and a bypass valve comprising a base defining a base sealing surface, the base defining a upstream utility bore, a downstream utility bore, a meter inlet bore, and a meter outlet bore each extending into the base sealing surface, the upstream utility bore connected in fluid communication with the upstream utility line, the downstream utility bore connected in fluid communication with the downstream utility line, the meter inlet bore connected in fluid communication with the meter inlet, the meter outlet bore connected in fluid communication with the meter outlet; and a selector defining a selector sealing surface positioned in sealing engagement with the base sealing surface, the selector defining a primary passage and a secondary passage, the selector defining at least one primary passage bore extending into the selector sealing surface and connecting in fluid communication with the primary passage, the selector defining at least one secondary passage bore extending into the selector sealing surface and connecting in fluid communication with the secondary passage, the selector being rotatable relative to the base about and between a meter position and a bypass position, the selector connecting the upstream utility bore in fluid communication with the meter inlet bore in the meter position, the selector connecting the upstream utility bore in fluid communication with the downstream utility bore in the bypass position.

Also disclosed is a method for routing a fluid flow through a utility metering system comprising positioning a selector of a bypass valve in a metering position, an upstream utility line of the utility metering system connected in fluid communication with an upstream utility bore defined by a base of the bypass valve, a downstream utility line of the utility metering system connected in fluid communication with a downstream utility bore defined by the base, a meter inlet of a meter of the utility metering system connected in fluid communication with a meter inlet bore defined by the base, a meter outlet of the meter of the utility metering system connected in fluid communication with a meter outlet bore defined by the base, the selector defining a primary passage and a secondary passage, the primary passage connecting the upstream utility bore in fluid communication with the meter inlet bore in the metering position, the secondary passage connecting the downstream utility bore in fluid communication with the meter outlet bore in the metering position, a fluid flow passing from the upstream utility line through the meter to the downstream utility line in the metering position; and rotating the selector relative to the base to position the selector in a bypass position, the secondary passage connecting the upstream utility bore in fluid communication with the downstream utility bore in the bypass position, the fluid flow passing from the upstream utility bore to the downstream utility bore and bypassing the meter in the bypass position.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
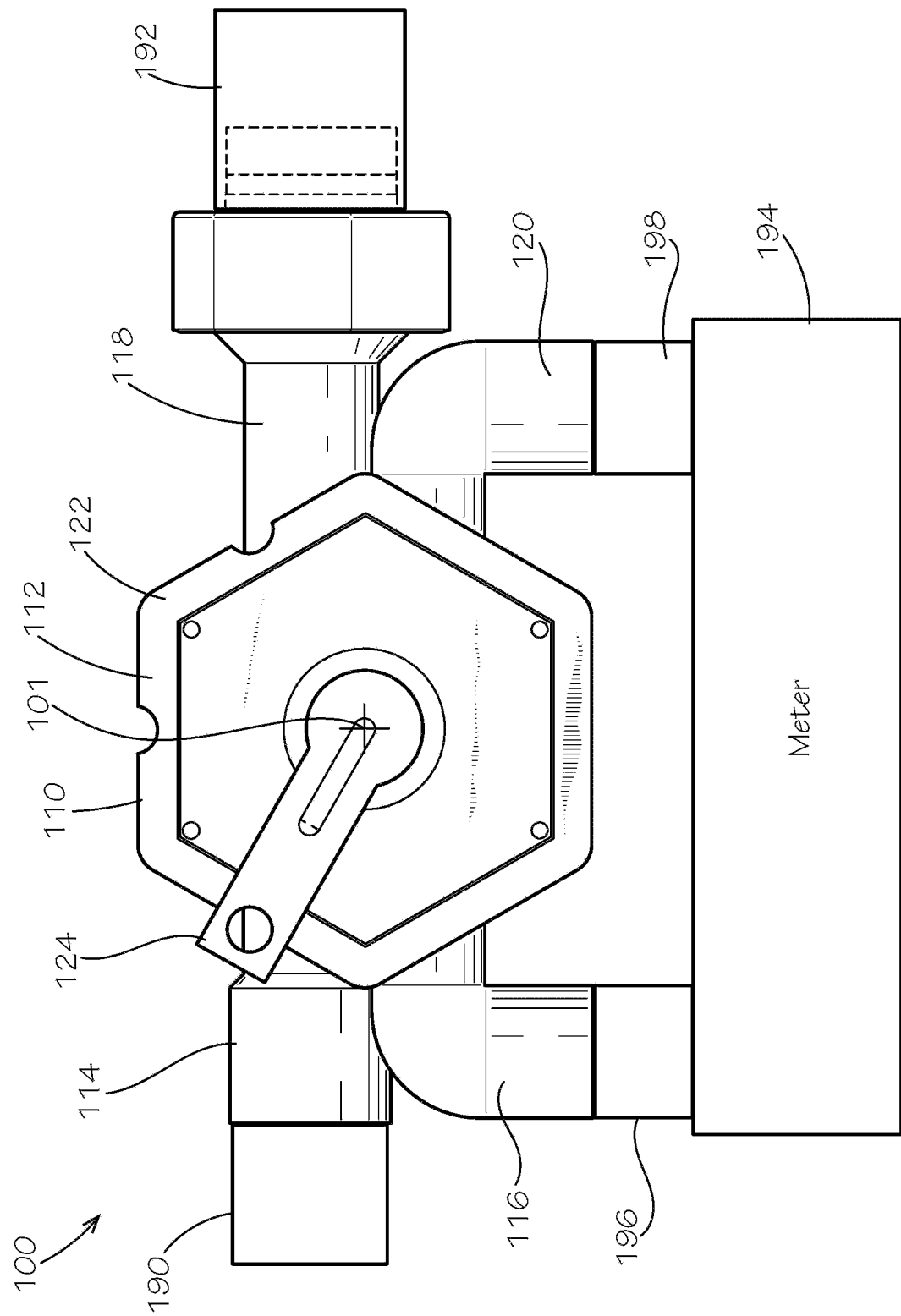
FIG. 1 is a front view of a utility metering system comprising a bypass valve, an upstream utility line, a downstream utility line, and a utility meter in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a utility metering system and associated methods, systems, devices, and various apparatus. The utility metering system can comprise a bypass valve, an upstream utility line, a downstream utility line, and a utility meter. It would be understood by one of skill in the art that the disclosed utility metering system is described in but a few exemplary embodiments among many. No particular terminology or description should be considered limiting on the disclosure or the scope of any claims issuing therefrom.

FIG. 1 is a front view of a utility metering system 100 comprising a bypass valve 110, an upstream utility line 190, a downstream utility line 192, and a utility meter 194.

The bypass valve 110 can comprise a base 112 and a selector member 124 that can be rotated relative to the base 112 to re-route flow of a fluid (represented by arrows in FIGS. 7-9) through the bypass valve 110. In the present aspect, the selector member 124 can be a selector lever 124. The base 112 can define an upstream utility connector 114, a meter inlet connector 116, a downstream utility connector 118, and a meter outlet connector 120, each extending outwards from a central body portion 122 of the base 112. The upstream utility connector 114 can be coupled to the upstream utility line 190. The meter inlet connector 116 can be coupled to an inlet 196 of the meter 194. The meter outlet connector 120 can be coupled to an outlet 198 of the meter 194. The downstream utility connector 118 can be coupled to the downstream utility line 192.

In the present aspect, the connectors 114,116,118,120 can be hard lines. In some aspects, the connectors 114,116,118,120 can be integrally formed with the base 112. For example and without limitation, the base 112 can be a casting, and some or all of each connector 114,116,118,120 can be defined by the casting. In some aspects, some or all of the connectors 114,116,118,120 can comprise one or more pipe or tubing fittings coupled to the base 112 and/or one another to form the respective connectors 114,116,118,120. In some aspects, some or all of the connectors 114,116,118,120 can be flexible lines, and those of the connectors 114,116,118, 120 that are flexible can be at least partially defined by a flexible member, such as a hose or soft tubing.

The upstream utility line 190 can carry a fluid, such as natural gas, propane, water, or any other liquid or gas, and the fluid can flow from the upstream utility line 190 to the bypass valve 110. As described in greater detail below, the selector lever 124 can be rotated relative to the base 112 about a rotational axis 101 (shown extending out of the page in the present view) of the base 112 to selectively reconfigure the bypass valve 110 about and between a bypass configuration (shown), a meter configuration (shown in FIG. 8), and a shutoff configuration (shown in FIG. 9).

In the bypass configuration, the fluid can flow directly from the upstream utility line 190 and through the bypass valve 110 to the downstream utility line 192. In the meter configuration, the fluid can flow from the upstream utility line 190 through the bypass valve 110 to the meter 194 via the meter inlet connector 116, through the meter 194 to the bypass valve 110 via the meter outlet connector 120, and then through the bypass valve 110 to the downstream utility line 192. In the shutoff configuration, the fluid can flow from the upstream utility line 190 to the bypass valve 110 where the flow of the fluid can be blocked within the bypass valve 110.

Figure 2:
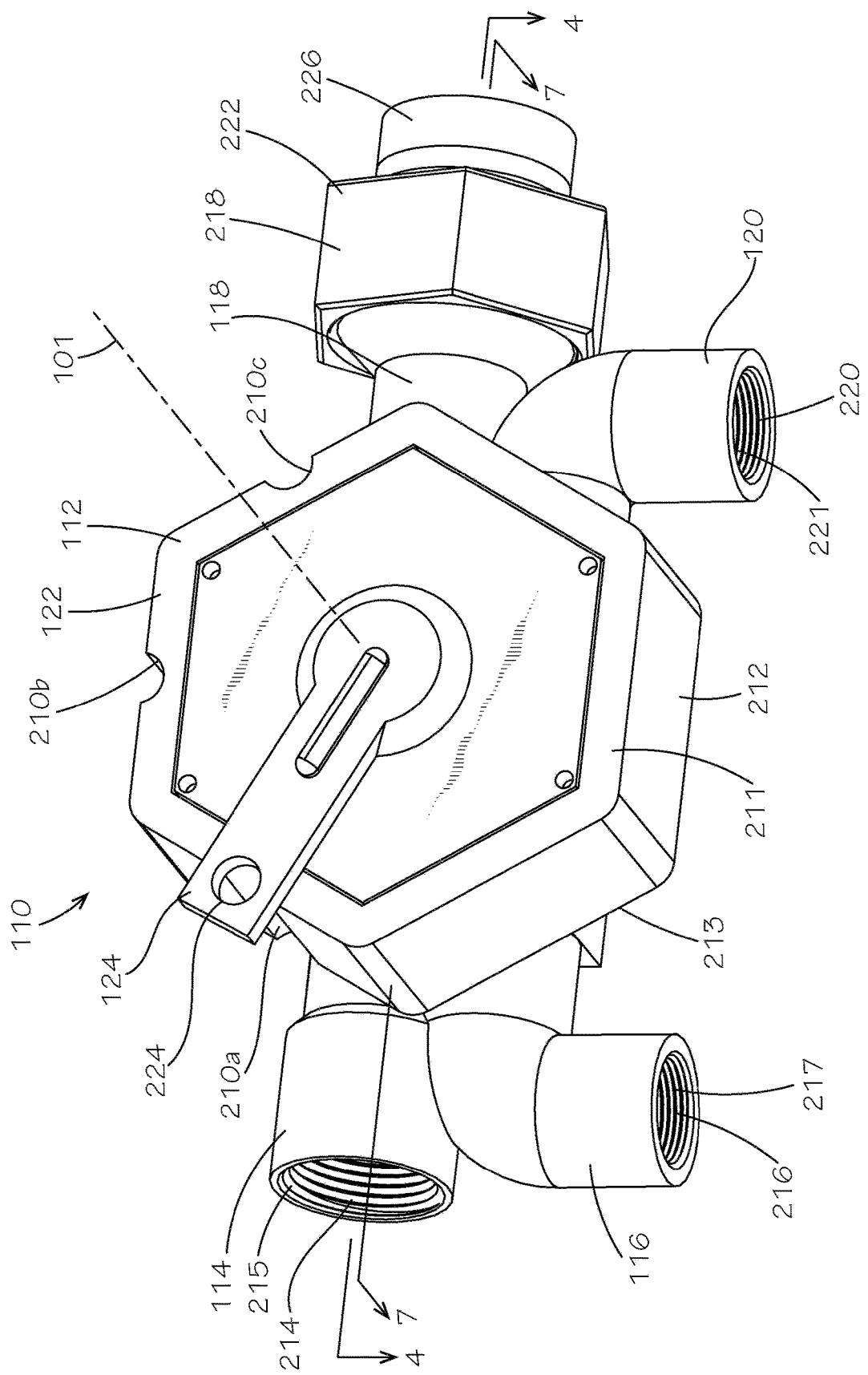
FIG. 2 is a perspective view of the bypass valve of FIG. 1 comprising a base and a selector member.

FIG. 2 is a perspective view of the bypass valve 110 of FIG. 1. The selector lever 124 can define a locking hole 224. The central body portion 122 of the base 112 can define a perimeter surface 212 extending around the central body portion 122 between a front end 211 of the central body portion 122 and a back end 213 of the central body portion 122. In the present aspect, the perimeter surface 212 can define a substantially hexagonal cross-sectional shape. The perimeter surface 212 can define a first locking notch 210a, a second locking notch 210b, and a third locking notch 210c. In the present aspect, the locking notches 210a,b,c, can be semi-cylindrical grooves; however, in other aspects, the locking notches 210a,b,c can be grooves of a different shape.

The locking hole 224 can align with the first locking notch 210a when the bypass valve 110 is in the bypass configuration. The locking hole 224 can align with the second locking notch 210b when the bypass valve 110 is in the meter configuration. The locking hole 224 can align with the third locking notch 210c when the bypass valve 110 is in the shutoff configuration. A lock, such as a common barrel lock (not shown), can be secured through the locking hole 224 and engage the respective locking notch 210a,b,c to prevent rotation of the selector lever 124 about the rotational axis 101 relative to the base 112, thereby securing the bypass valve 110 in the selected configuration and preventing unauthorized reconfiguration or tampering with the bypass valve 110.

The upstream utility connector 114 can define an upstream utility connector passage 214. The meter inlet connector 116 can define a meter inlet connector passage 216. The downstream utility connector 118 can define a downstream utility connector passage 418 (shown in FIG. 4). The meter outlet connector 120 can define a meter outlet connector passage 220. In the present aspect, the upstream utility connector 114, the meter inlet connector 116, and the meter outlet connector 120 can respectively define internally threaded portions 215,217,221 for coupling the bypass valve 110 to the meter 194 (shown in FIG. 1) and the upstream utility line 190 (shown in FIG. 1).

In the present aspect, the downstream utility connector 118 can comprise a coupler 218. The coupler 218 can comprise a threaded collar 222 that threadedly engages an externally threaded portion 419 (shown in FIG. 4) of the downstream utility connector 118. The coupler 218 can comprise a threaded fitting 226 that can be coupled to the threaded collar 222, and the threaded fitting 226 can define an internally threaded portion 425 (shown in FIG. 4) for coupling the bypass valve 110 to the downstream utility line 192 (shown in FIG. 1). In some aspects, any or all of the connectors 114,116,120 can comprise the coupler 218. In some aspects, they downstream utility connector 118 may not comprise the coupler 218.

Figure 3:
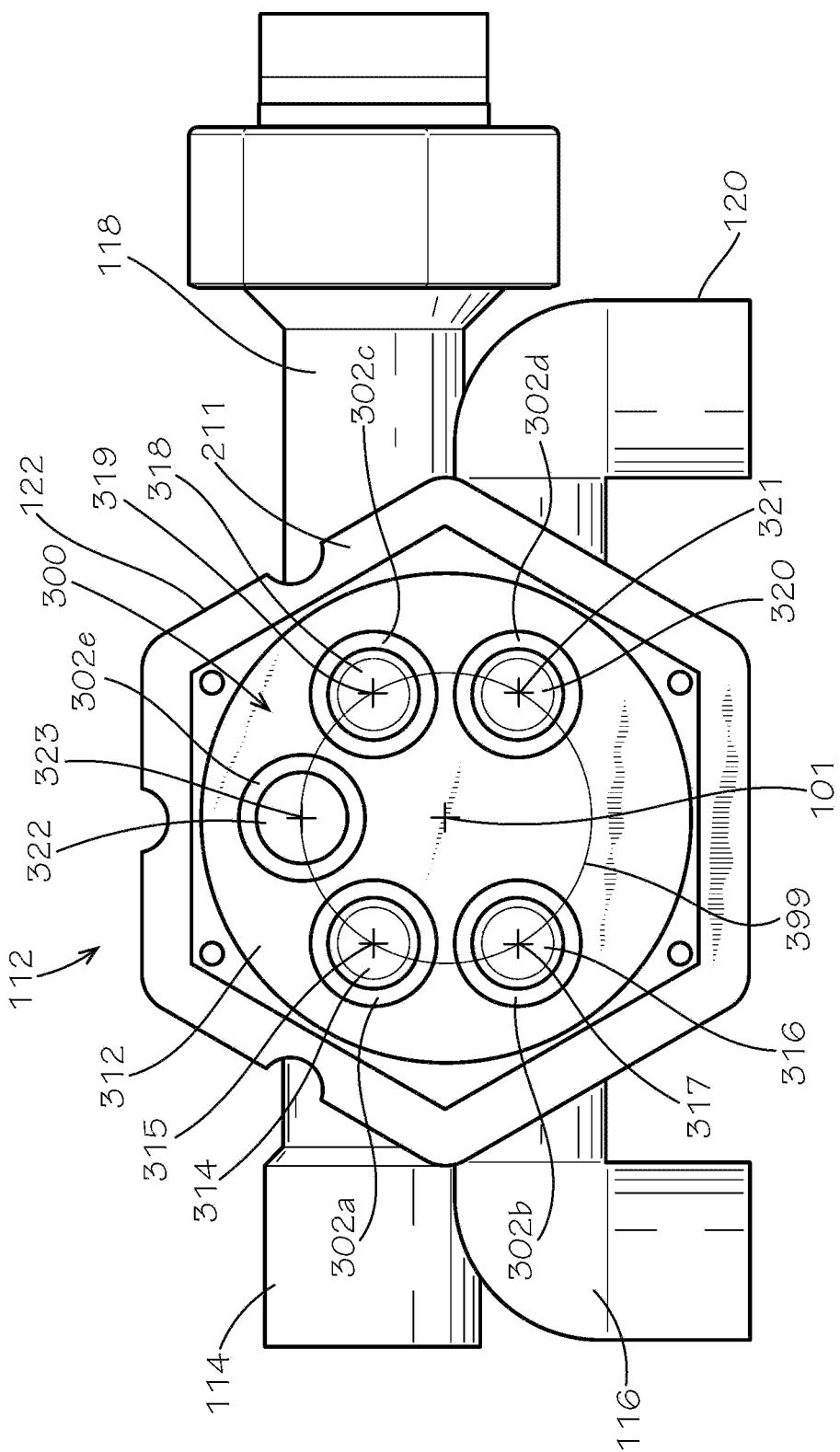
FIG. 3 is a front view of the base of FIG. 2 of the bypass valve of FIG. 1.

The passages 214,216,220,418 (passage 418 shown in FIG. 4) can connect in fluid communication with a plurality of bores 314,316,318,320 shown in FIG. 3.

FIG. 3 is a front view of the base 112 of the bypass valve 110 of FIG. 1. The base 112 can define a base cavity 300. The base cavity 300 can extend into the central body portion 122 from the front end 211 to a base sealing surface 312 positioned between the front end 211 and the back end 213 (shown in FIG. 2). In the present aspect, the base sealing surface 312 can define a substantially circular shape. The base sealing surface 312 can be centered relative to the rotational axis 101, and the base sealing surface 312 can be substantially perpendicular to the rotational axis 101.

Figure 4:
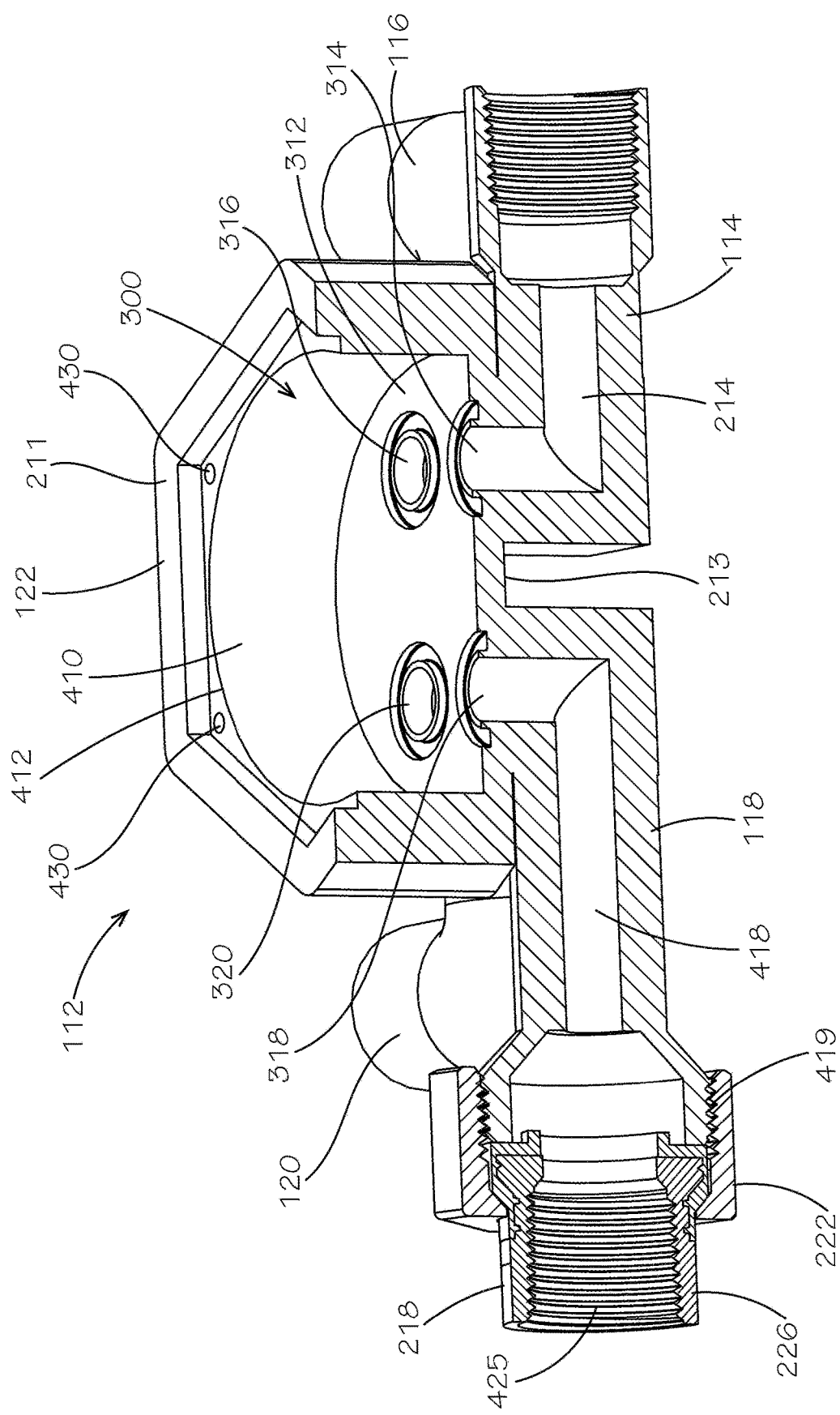
FIG. 4 is a cross-sectional view of the base of FIG. 2 of the bypass valve of FIG. 1, taken along line 4-4 shown in FIG. 2.

The central body portion 122 can define an upstream utility bore 314, a meter inlet bore 316, a downstream utility bore 318, and a meter outlet bore 320. Each of the bores 314,316,318,320 can extend through the central body portion 122 of the base 112 from the base sealing surface 312 to the back end 213 (shown in FIGS. 2 and 4). The upstream utility bore 314 can intersect the upstream utility connector passage 214 (shown in FIG. 2) defined by the upstream utility connector 114. The meter inlet bore 316 can intersect the meter inlet connector passage 216 (shown in FIG. 2) defined by the meter inlet connector 116. The downstream utility bore 318 can intersect the downstream utility connector passage 418 (shown in FIG. 4) defined by the downstream utility connector 118. The meter outlet bore 320 can intersect the meter outlet connector passage 220 (shown in FIG. 2) defined by the meter outlet connector 120. Referring ahead to FIG. 4, the intersection of the upstream utility connector passage 214 with the upstream utility bore 314 and the intersection of the downstream utility connector passage 418 with the downstream utility bore 318 can be seen in FIG. 4.

Returning to FIG. 3, the upstream utility bore 314 can define an upstream utility bore axis 315. The meter inlet bore 316 can define a meter inlet bore axis 317. The downstream utility bore 318 can define a downstream utility bore axis 319. The meter outlet bore 320 can define a downstream utility bore axis 321. In the present aspect, the bore axes 315,317,319,321 can be parallel to the rotational axis 101 and perpendicular to the base sealing surface 312 (axes 101,315,317,319,321 shown extending out of the page). In other aspects, the bores 314,316,318,320 can be angled relative to the base sealing surface 312, and the bore axes 315,317,319,321 may not be perpendicular to the base sealing surface 312.

Figure 5:
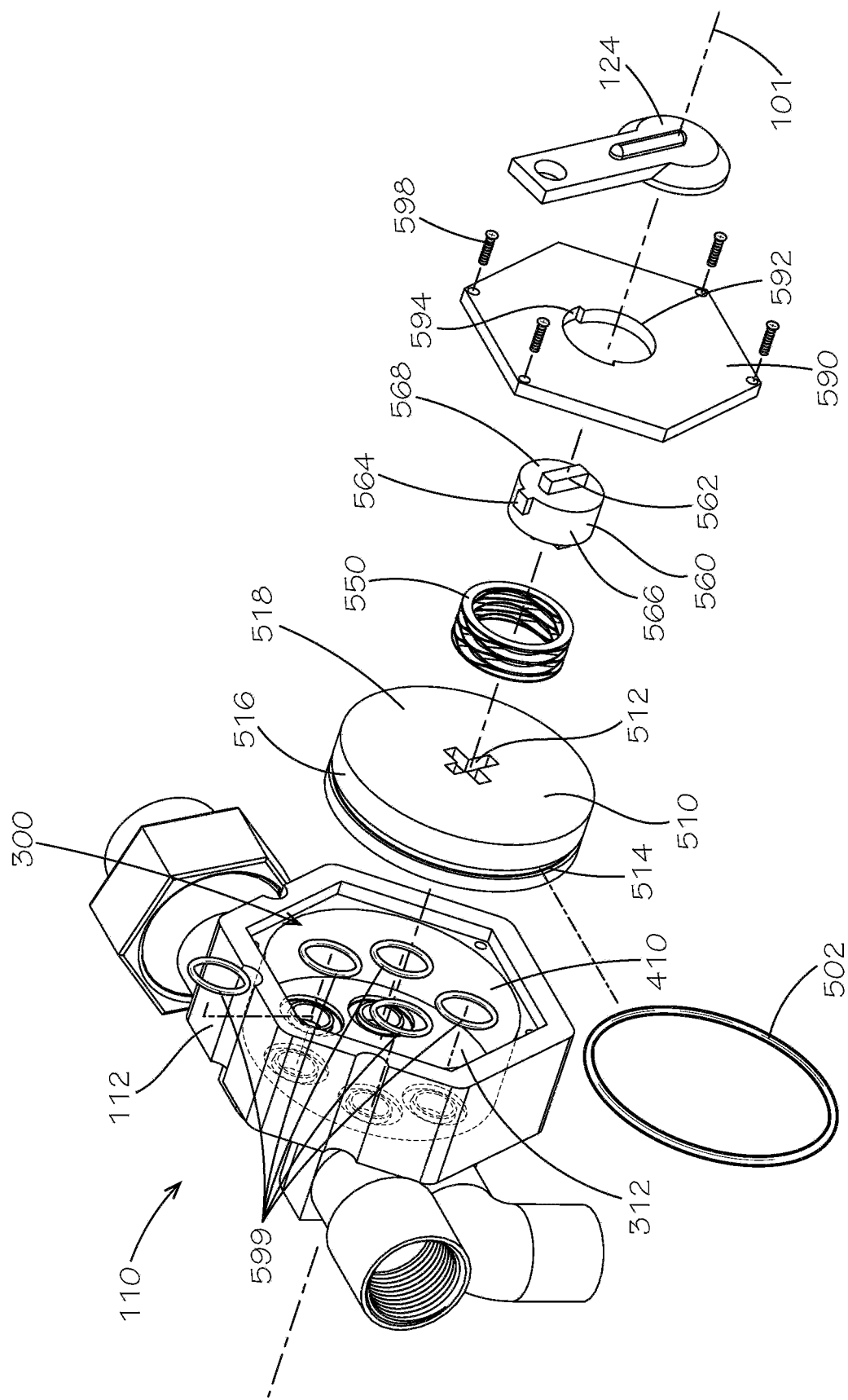
FIG. 5 is an exploded perspective front view of the bypass valve of FIG. 1.

The central body portion 122 can define a plurality of sealing grooves 302a,b,c,d,e, each extending into the base sealing surface 312 towards the back end 213 (shown in FIG. 2). Sealing grooves 302a,b,c,d can respectively encircle bores 314,316,318,320. Sealing groove 302e can encircle a blind face 322 defined by the base sealing surface 312, which can be defined by a solid portion of the central body portion 122, rather than by a bore or opening. Each of the sealing grooves 302a,b,c,d,e can be configured to receive an O-ring 599, as shown in FIG. 5.

The blind face 322 can define a center point 323. As shown, the center point 323 and bore axes 315,317,319,321 can be positioned in a circular pattern 399 centered about the rotational axis 101. As viewed in a clockwise direction with respect to the present viewing angle, bore 316, bore 314, blind face 322, bore 318, and bore 320 can be spaced about 60-degrees apart on the circular pattern 399 in the present aspect. Bores 316 and 320 can be spaced about 120-degrees apart on the circular pattern 399. In some aspects, a second blind face (not shown) can be defined between bores 316, 320 and spaced 60-degrees from each bore 316,320 on the circular pattern 399.

FIG. 4 is a cross-sectional view of the base 112 of FIG. 1, taken along line 4-4 shown in FIG. 2. The central body portion 122 of the base 112 can define a support ledge 412 within the base cavity 300 between the front end 211 and the base sealing surface 312. The support ledge 412 can define a plurality of fastener holes 430. The support ledge 412 can be configured to support a lid 590 (shown in FIG. 5) of the bypass valve 110 (shown in FIG. 1), and the fastener holes 430 can be configured to receive fasteners 598 (shown in FIG. 5) to secure the lid 590 in place, thereby enclosing the base cavity 300. The central body portion 122 can also define a sidewall sealing surface 410 extending between the base sealing surface 312 and the support ledge 412. In the present aspect, the sidewall sealing surface 410 can be substantially cylindrical in shape.

As shown and noted above, the connectors 114,116,118, 120 can be integrally formed with the central body portion 122 of the base 112. In the present aspect, the connectors 114,116,118,120 can be formed with and extend outwards from the back end 213 of the central body portion 122. In integrally formed aspects, the connectors 114,116,118,120 can at least partially define the bores 314,316,318,320. In some aspects, the connectors 114,116,118,120 can be separate components connected to the central body portion 122. For example and without limitation, in some aspects, the bores 314,316,318,320 can define a threaded portion at the back end 213, and the connectors 114,116,118,120 can threadedly couple to the respective bores 314,316,318,320.

Figure 6:
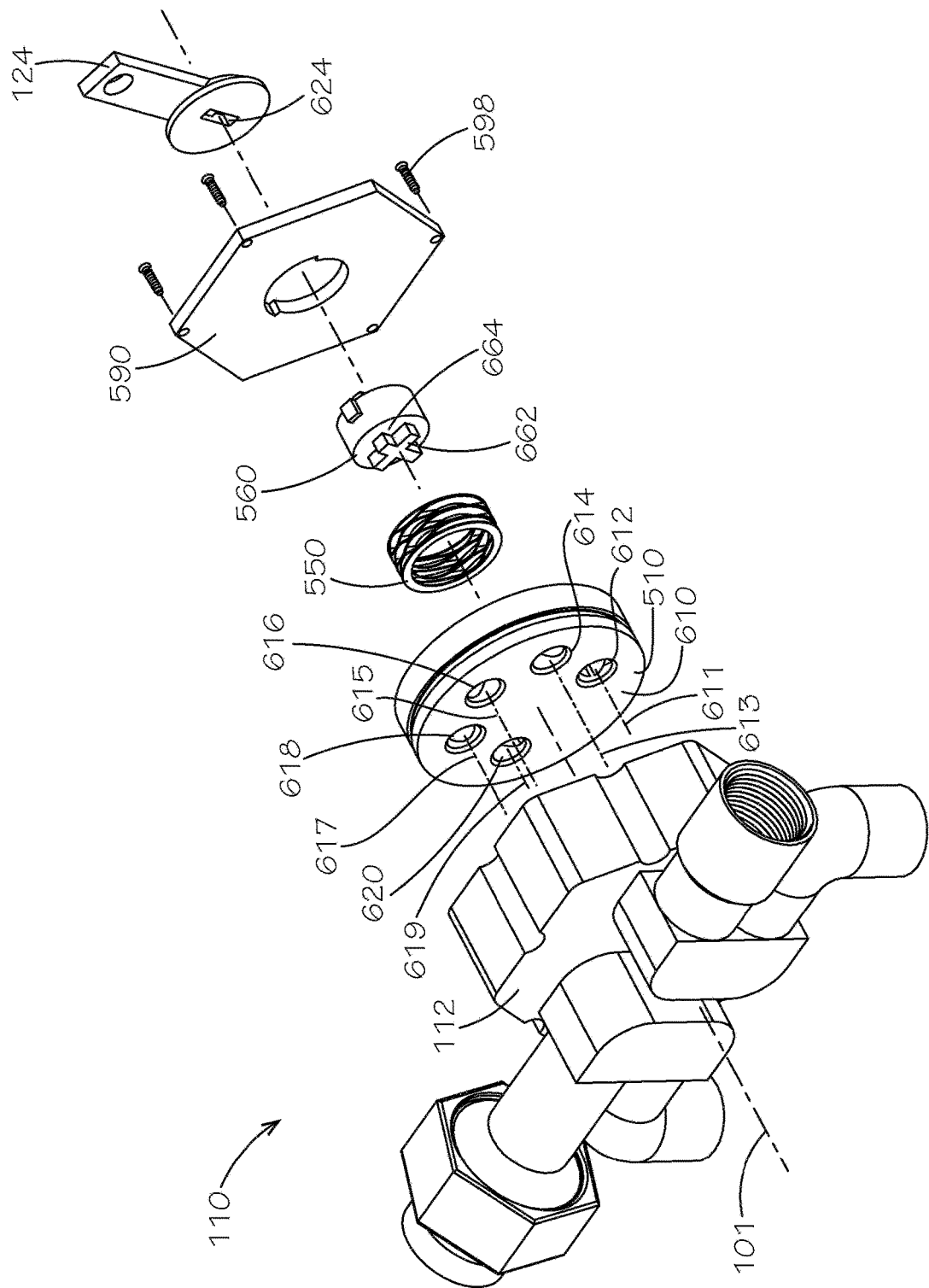
FIG. 6 is an exploded perspective rear view of the bypass valve of FIG. 1.

FIG. 5 is an exploded perspective front view of the bypass valve 110 of FIG. 1. FIG. 6 is an exploded perspective rear view of the bypass valve 110 of FIG. 1. Each of these Figures is shown exploded along the rotational axis 101. These Figures are discussed together below.

As shown, the bypass valve 110 can further comprise an outer O-ring 502 (shown in FIG. 5), a selector 510, a spring 550, a stub shaft 560, a plurality of fasteners 598, and a plurality of O-rings 599 (shown in FIG. 5). In the assembled state shown in FIGS. 1 and 2, the selector 510 and the spring 550 can be positioned in the base cavity 300 (shown in FIG. 5) between the lid 590 and the base sealing surface 312, and the stub shaft 560 can be positioned at least partially inside the base cavity 300.

The spring 550 can be a wave spring configured to fit around the stub shaft 560. In other aspects, the spring 550 can be a different type of spring, such as a coil spring or one or more Belleville washers, for example and without limitation.

The selector 510 can define an O-ring slot 514 (shown in FIG. 5) for receiving the outer O-ring 502. The O-ring slot 514 can be circumferential such that the O-ring slot 514 extends around an outer surface 516 of the selector 510. The outer surface 516 can extend between a front surface 518 (shown in FIG. 5) of the selector 510, which faces the lid 590, and a selector sealing surface 610 (shown in FIG. 6) of the selector 510, which faces the base 112. The outer O-ring 502 can form a seal between the outer surface 516 and the sidewall sealing surface 410 (shown in FIG. 5) when the selector 510 is positioned within the base cavity 300. In the present aspect, the front surface 518 can be substantially parallel to the selector sealing surface 610.

The front surface 518 of the selector 510 can define a selector indexing depression 512. In the present aspect, the selector indexing depression 512 can be shaped as a lower-case letter "t" with one leg of the depression formed longer than the others. The selector indexing depression 512 can receive a complimentarily-formed first indexing key 662 (shown in FIG. 6), defined by a rear shaft surface 664 (shown in FIG. 6) of the stub shaft 560. The shape of the selector indexing depression 512 and the first indexing key 662 ensures that the two can only rotationally index together in one orientation, thereby preventing improper rotational indexing between the two components.

A front shaft surface 568 (shown in FIG. 5) of the stub shaft 560 can define a second indexing key 562 (shown in FIG. 5), opposite from the first indexing key 662, which can be configured to engage a complimentarily-formed selector indexing depression 624 (shown in FIG. 6) of the selector lever 124. Engagement of the second indexing key 562 with the selector indexing depression 624 can rotationally fix the selector lever 124 to the stub shaft 560. Engagement of the first indexing key 662 with the selector indexing depression 512 can rotationally fix the stub shaft 560 to the selector 510. Accordingly, the selector lever 124 can be rotationally fixed to the selector 510, and rotation of the selector lever 124 can selectively reposition the selector 510, the stub shaft 560, and the selector lever 124 between the meter position, the bypass position, and the shutoff position, respectively corresponding to the meter configuration, the bypass configuration, and the shutoff configuration discussed above with respect to FIG. 1-2.

The stub shaft 560 can extend through a hole 592 (shown in FIG. 5) in the lid 590 to connect the selector 510, positioned within the base cavity 300, with the selector lever 124, positioned external to the base cavity 300. The stub shaft 560 can define a limiting tab 564 (shown in FIG. 5), which can extend radially outward from a circumferential outer surface 566 (shown in FIG. 5) of the stub shaft 560, with respect to the rotational axis 101. The hole 592 in the lid 590 can define an enlarged arc 594 (shown in FIG. 5), which can receive the limiting tab 564. The enlarged arc 594 can define a greater radius with respect to the rotational axis 101 than the rest of the hole 592. In the present aspect, the enlarged arc 594 can extend around a 120-degree portion of a perimeter of the hole 592. Engagement between the enlarged arc 594 and the limiting tab 564 can limit rotation of the stub shaft 560, and thereby the selector 510 and selector lever 124, to travel about and between the meter position, the bypass position, and the shutoff position.

The selector 510 can define a plurality of bores 612,614, 616,618,620 (shown in FIG. 6) extending into the selector sealing surface 610 and towards the front surface 518. In the present aspect, each of the bores 612,614,616,618,620 can be cylindrical in shape. Each bore 612,614,616,618,620 can respectively define an axis 611,613,615,617,619, (shown in FIG. 6) which can be parallel to the rotational axis 101.

As described below in greater detail with respect to FIGS. 7-9, the bores 612,614 can be "primary passage bores" or "bores of the primary passage," and the bores 616,618,620 can be "secondary passage bores" or "bores of the secondary passage." When the bypass valve 110 is assembled, each O-ring 599 can fit into a different one of the sealing grooves 302a,b,c,d,e (shown in FIG. 3), and the O-rings 599 can form seals between the base sealing surface 312 and the selector sealing surface 610 so that the selector sealing surface 610 can be positioned in sealing engagement with the base sealing surface 312. The selector sealing surface 610 can be planar, and the selector sealing surface 610 can be positioned parallel to the base sealing surface 312 and perpendicular to the rotational axis 101. The base sealing surface 312 can be substantially planar with the exception of the sealing grooves 302a,b,c,d,e. In other aspects, the selector sealing surface 610 can define the sealing grooves 302a,b,c,d,e, and the O-rings 599 can fit around the bores 612,614,616,618,620.

The spring 550 can be positioned between the lid 590 and the selector 510 to press the selector 510 towards the base sealing surface 312, thereby energizing the seals formed by each O-ring 599. As the selector 510 rotates between the meter position, the bypass position, and the shutoff position, the O-rings 599 can selectively connect in fluid communication different combinations of the bores 612,614,616,618, 620 of the selector 510 with the bores 314,316,318,320 (shown in FIG. 3) and the blind face 322 (shown in FIG. 3) of the base 112 to route fluid through the bypass valve 110 differently in the meter configuration, the bypass configuration, and the shutoff configuration. While rotating the selector 510, the O-rings 599 can seal with the selector sealing surface 610 to prevent leakage, such as while transitioning between the metering, bypass, and shutoff positions.

Figure 7:
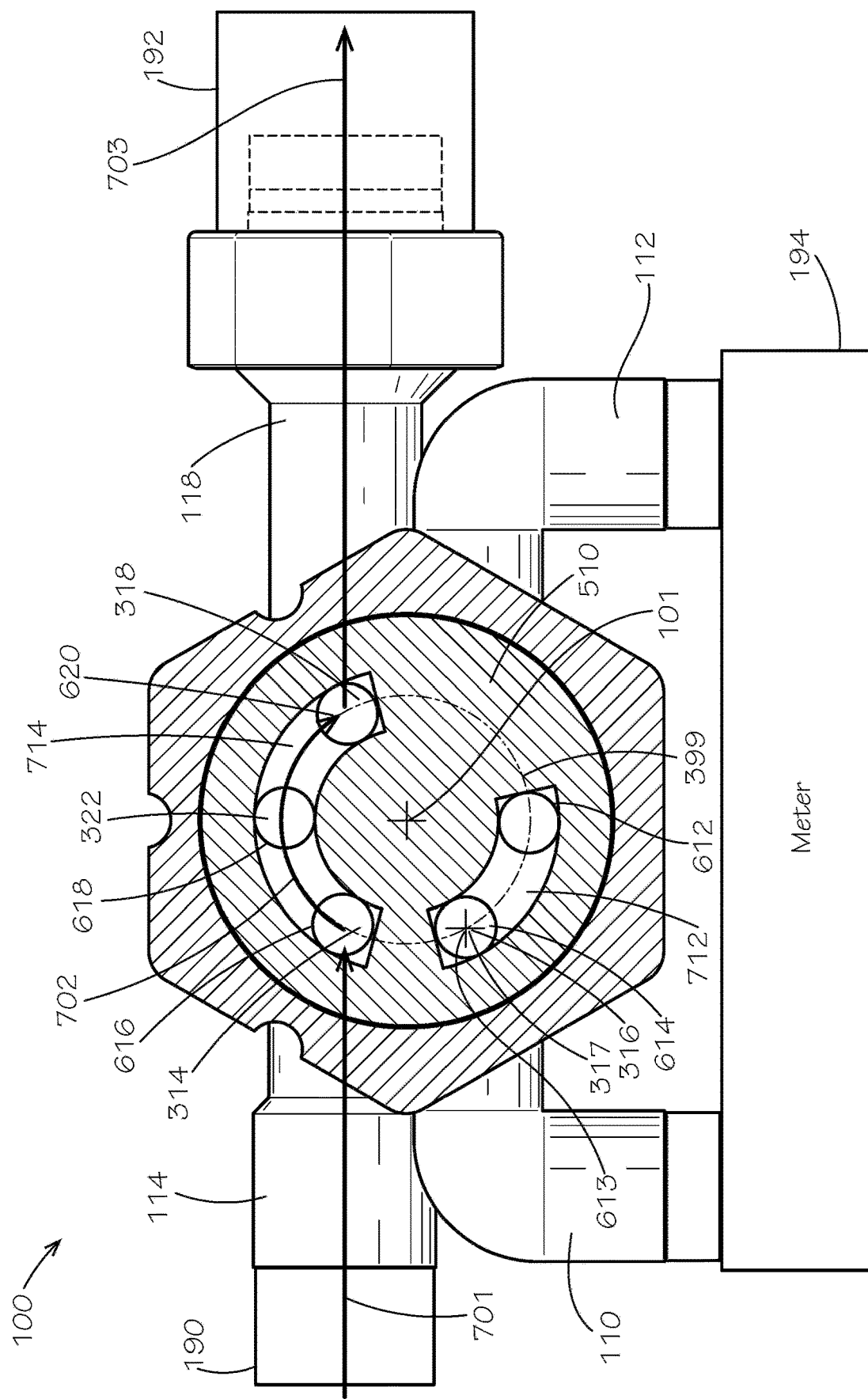
FIG. 7 is a cross-sectional view of the utility metering system of FIG. 1, taken along line 7-7 shown in FIG. 2, with the bypass valve in a bypass configuration.
Figure 8:
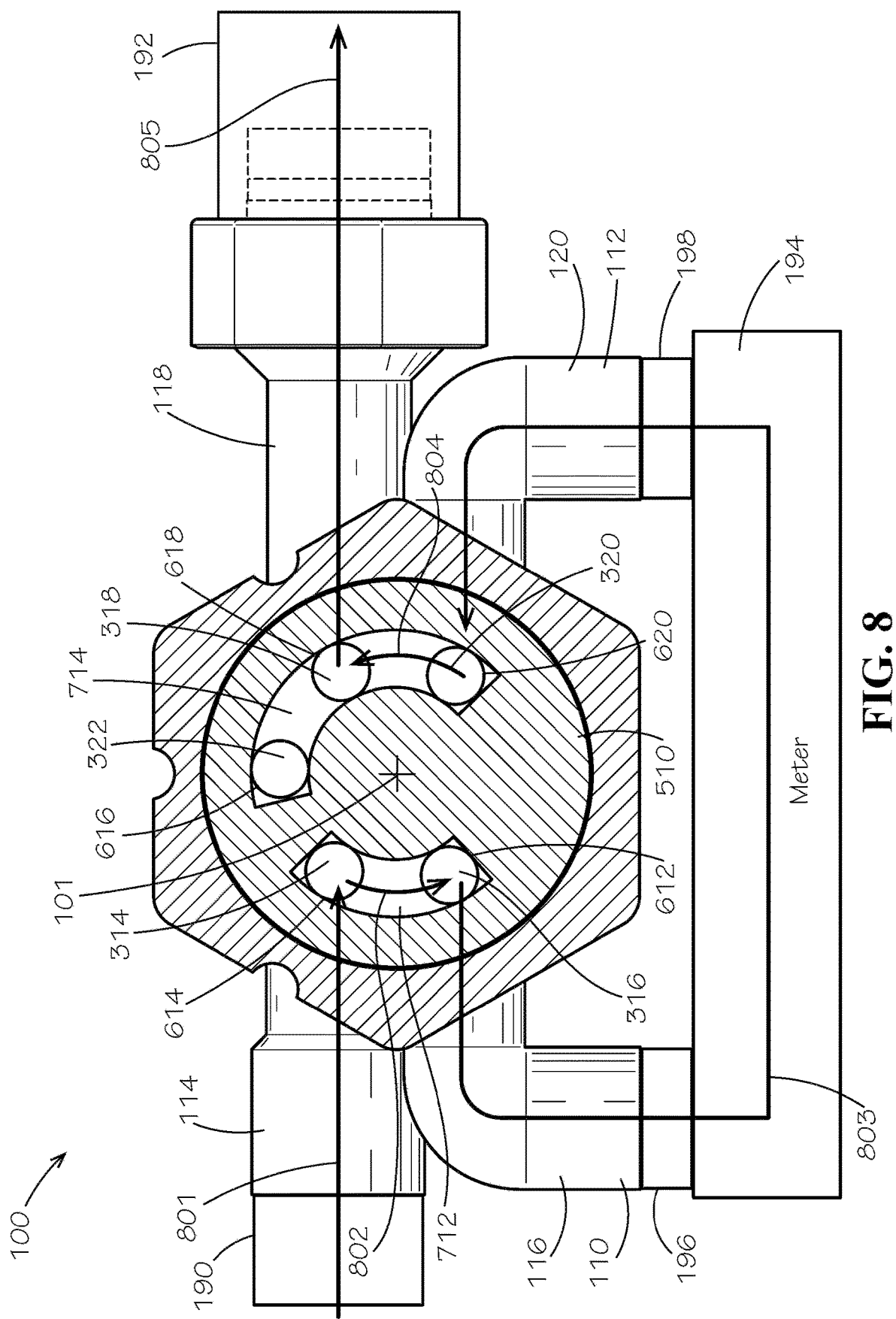
FIG. 8 is a cross-sectional view of the utility metering system of FIG. 1, taken along line 7-7 shown in FIG. 2, with the bypass valve in a meter configuration.
Figure 9:
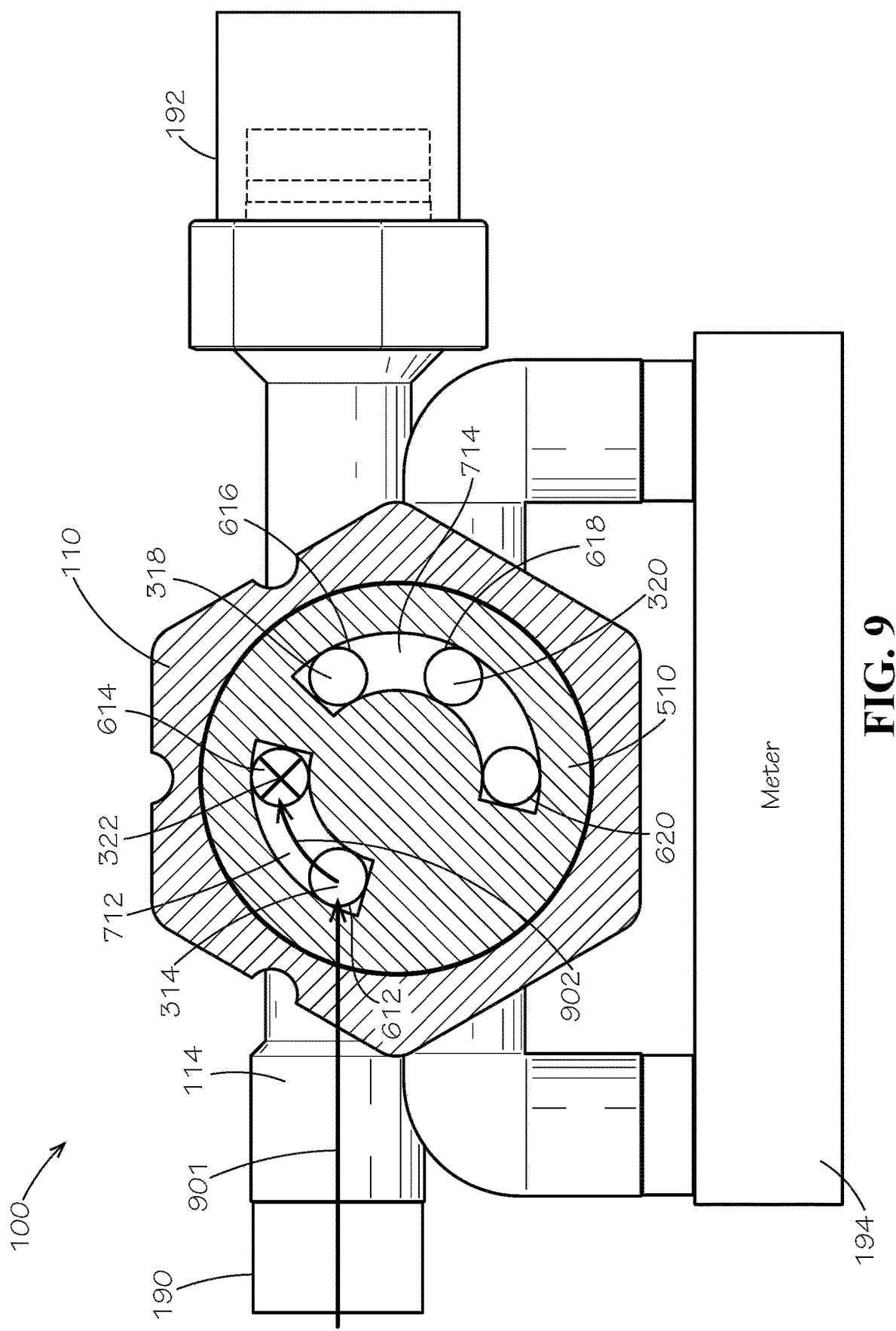
FIG. 9 is a cross-sectional view of the utility metering system of FIG. 1, taken along line 7-7 shown in FIG. 2, with the bypass valve in a shutoff configuration.

FIGS. 7-9 are cross-sectional views of the utility metering system 100, taken along Line 7-7 shown in FIG. 2. In FIG. 7, the bypass valve 110 is in the bypass configuration, and the selector 510 is in the bypass position.

The selector 510 can internally define a primary passage 712 and a secondary passage 714, between the selector sealing surface 610 (shown in FIG. 6) and the front surface 518 (shown in FIG. 5). In the present aspect, the passages 712,714 can define circular cross-sections, and the cross-sectional plane taken along Line 7-7 can substantially bisect the passages 712,714. In other aspects, the passages 712,714 can define a different cross-sectional shape, such as oval, square, rectangular, or any other suitable shape.

The primary passage bores 612,614 can connect in fluid communication with the primary passage 712. The secondary passage bores 616,618,620 can connect in fluid communication with the secondary passage 714. The passages 712,714 can be isolated from one another such that they are not connected in fluid communication with one another within the selector 510 itself. The bores 612,614,616,618, 620 can also be spaced on the circular pattern 399 about the rotational axis 101 (shown extending out of the page). Bores 612,614,616,618,620 can each be spaced 60-degrees from the nearest adjacent bore, and bores 612 and 620 can be spaced 120-degrees about the circular pattern 399. In the present aspect, the passages 712,714 can be centered around the circular pattern 399 as well, such that the passages 712,714 can define arcuate shapes; however, in other aspects, the passages 712,714 may not follow the circular pattern 399. For example and without limitation, the primary passage 712 may define a straight path between bores 612,614 in some aspects.

In the present aspect, the bypass valve 110 is in the bypass configuration, and the selector 510 is in the corresponding bypass position. In the bypass position, the secondary passage bore 616 can align with and connect in fluid communication with the upstream utility bore 314, the secondary passage bore 618 can align with and be sealed by the blind face 322, and the secondary passage bore 620 can align with and connect in fluid communication with the downstream utility bore 318.

A flow of the fluid is shown through the utility metering system 100 in the bypass configuration by the flow arrows 701,702,703. The flow arrow 701 shows that the fluid can pass from the upstream utility line 190 to the upstream utility connector 114, through the upstream utility connector passage 214 (shown in FIG. 2) to the upstream utility bore 314. The fluid can then flow from the upstream utility bore 314 into the secondary passage 714 through secondary passage bore 616. Flow arrow 702 then shows that the fluid can pass through the secondary passage 714 to secondary passage bore 620, passing over secondary passage bore 618, which can be blocked by blind face 322. From the secondary passage bore 620, the fluid can then flow into the downstream utility bore 318 and through the downstream utility connector passage 418 (shown in FIG. 4) of the downstream utility connector 118 to the downstream utility line 192, as shown by flow arrow 703. In the bypass configuration, no fluid flows through the primary passage 712, and the meter 194 can be bypassed so that no fluid passes through the meter 194. In other words, the secondary passage 714 can directly connect the upstream utility connector 114 in fluid communication with the downstream utility connector 118 in the bypass configuration/position.

The primary passage bore 612 is not aligned or connected in fluid communication with any of the bores 314,316,318, 320 (meter outlet bore 320 shown in FIG. 8) or the blind face 322. In some aspects, a second blind face (not shown) may be positioned opposite the rotational axis 101 from the blind face 322 so that it would align and seal with the primary passage bore 612 in the position shown. The primary passage bore 614 can align and connect in fluid communication with the meter inlet bore 316; however, no fluid flows through the meter 194. The meter outlet bore 320 (shown in FIG. 8) can seal with the selector sealing surface 610 (shown in FIG. 6), which effectively acts as a blind surface to prevent flow through the meter outlet bore 320.

As shown by the meter inlet bore 316 and the primary passage bore 614, when one of the bore 314,316,318,320 aligns with one of the bores 612,614,616,618,620 of the selector 510, the two bores can be coaxial with one another, as demonstrated by the respective axes 317,613 (each shown coming out of the page) of the meter inlet bore 316 and the primary passage bore 614.

The selector 510 can be repositioned from the bypass position to the meter position by rotating the selector lever 124 (shown in FIG. 1), the stub shaft 560 (shown in FIG. 5), and the selector 510 sixty degrees about the rotational axis 101 in a clockwise direction with respect to the present viewing angle. With the selector 510, the selector lever 124, and the stub shaft 560 in the metering position, the bypass valve 110 can be placed in the metering configuration shown in FIG. 8.

In FIG. 8, the bypass valve 110 is shown in the meter configuration, and the selector 510 is shown in the corresponding meter position. In the meter position, the primary passage bore 614 can align with and connect in fluid communication with the upstream utility bore 314, and the primary passage bore 612 can align with and connect in fluid communication with the meter inlet bore 316. Additionally, the secondary passage bore 618 can align and connect in fluid communication with the downstream utility bore 318, the secondary passage bore 620 can align and connect in fluid communication with the meter outlet bore 320, and the secondary passage bore 616 can align with and be sealed by the blind face 322.

A flow of the fluid is shown through the utility metering system 100 in the metering configuration by the flow arrows 801,802,803,804,805. The flow arrow 801 shows that the fluid can pass from the upstream utility line 190 to the upstream utility connector 114, through the upstream utility connector passage 214 (shown in FIG. 2) to the upstream utility bore 314. The fluid can then flow from the upstream utility bore 314 into the primary passage 712 through primary passage bore 614. Flow arrow 802 shows that the fluid can then pass through the primary passage 712 from the primary passage bore 614 to the primary passage bore 612, where the fluid can pass into the meter inlet bore 316. Next, flow arrow 803 shows that the fluid can pass through the meter inlet connector passage 216 (shown in FIG. 2) of the meter inlet connector 116 to the inlet 196 of the meter 194, then through the meter 194 to the outlet 198 of the meter 194, then through the meter outlet connector passage 221 (shown in FIG. 2) of the meter outlet connector 120 to the meter outlet bore 320. The fluid can enter the secondary passage 714 from the meter outlet bore 320 through the secondary passage bore 620, where the fluid can then flow to secondary passage bore 618, and into the downstream utility bore 318, as shown by flow arrow 804. Flow arrow 804 does not extend to the secondary passage bore 616 because the secondary passage bore 616 can be sealed and blocked by the blind face 322. From the downstream utility bore 318, the fluid can then flow through the downstream utility connector passage 418 (shown in FIG. 4) of the downstream utility connector 118 to the downstream utility line 192, as shown by flow arrow 805.

When the fluid passes through the meter 194, the meter 194 can take measurements of one or more parameters related to the fluid, the flow of the fluid, or both, and values of the parameter(s) can be recorded. For example and without limitation, the meter 194 can measure and record a flowrate of the fluid, such as a volumetric flowrate, and an aggregate flow through the meter 194 over a designated time period can also be recorded.

The bypass valve 110 can be placed in the shutoff configuration by rotating the rotating the selector lever 124 (shown in FIG. 1), the stub shaft 560 (shown in FIG. 5), and the selector 510 sixty degrees about the rotational axis 101 in a clockwise direction with respect to the present viewing angle from the metering position to the shutoff position, as shown in FIG. 9.

Referring to FIG. 9, in the shutoff configuration, there is no flow through the bypass valve 110 from the upstream utility line 190 to the downstream utility line 192. Here, rather than showing actual flow through the bypass valve 110, the arrows 901,902 only denote which passages are connected in fluid communication with the upstream utility line 190. As shown by arrow 901, the upstream utility line 190 can be connected in fluid communication with the upstream utility bore 314 through the upstream utility connector passage 214 (shown in FIG. 2) of the upstream utility connector 114. The upstream utility bore 314 can be connected in fluid communication with the primary passage 712 through the primary passage bore 612. As shown by arrow 902, the primary passage bore 614 can be connected in fluid communication with the primary passage bore 612; however, the primary passage bore 614 can be sealed by the blind face 322, thereby preventing fluid flow through the primary passage bore 614, as denoted by the "X". Accordingly, no fluid actually flows into or through the bypass valve 110 in the shutoff configuration, beyond a transient moment after being switched to the shutoff configuration wherein pressure of the fluid in the primary passage 712 equalizes with pressure of the fluid in the upstream utility line 190.

No fluid flows through the secondary passage 714 in the shutoff configuration/position. The secondary passage bore 616 can align and connect in fluid communication with the downstream utility bore 318. The secondary passage bore 618 can align and connect in fluid communication with the meter outlet bore 320; however, no fluid flows through the meter 194. The meter inlet bore 316 (shown in FIG. 8) can seal with the selector sealing surface 610 (shown in FIG. 6), which effectively acts as a blind surface to prevent flow through the meter inlet bore 316. The secondary passage bore 620 is not aligned or connected in fluid communication with any of the bores 314,316,318,320 (meter inlet bore 316 shown in FIG. 8) or the blind face 322. As described above, in some aspects, a second blind face (not shown) may be positioned so that it would align and seal with the secondary passage bore 620 in the position shown.

Figure 10:
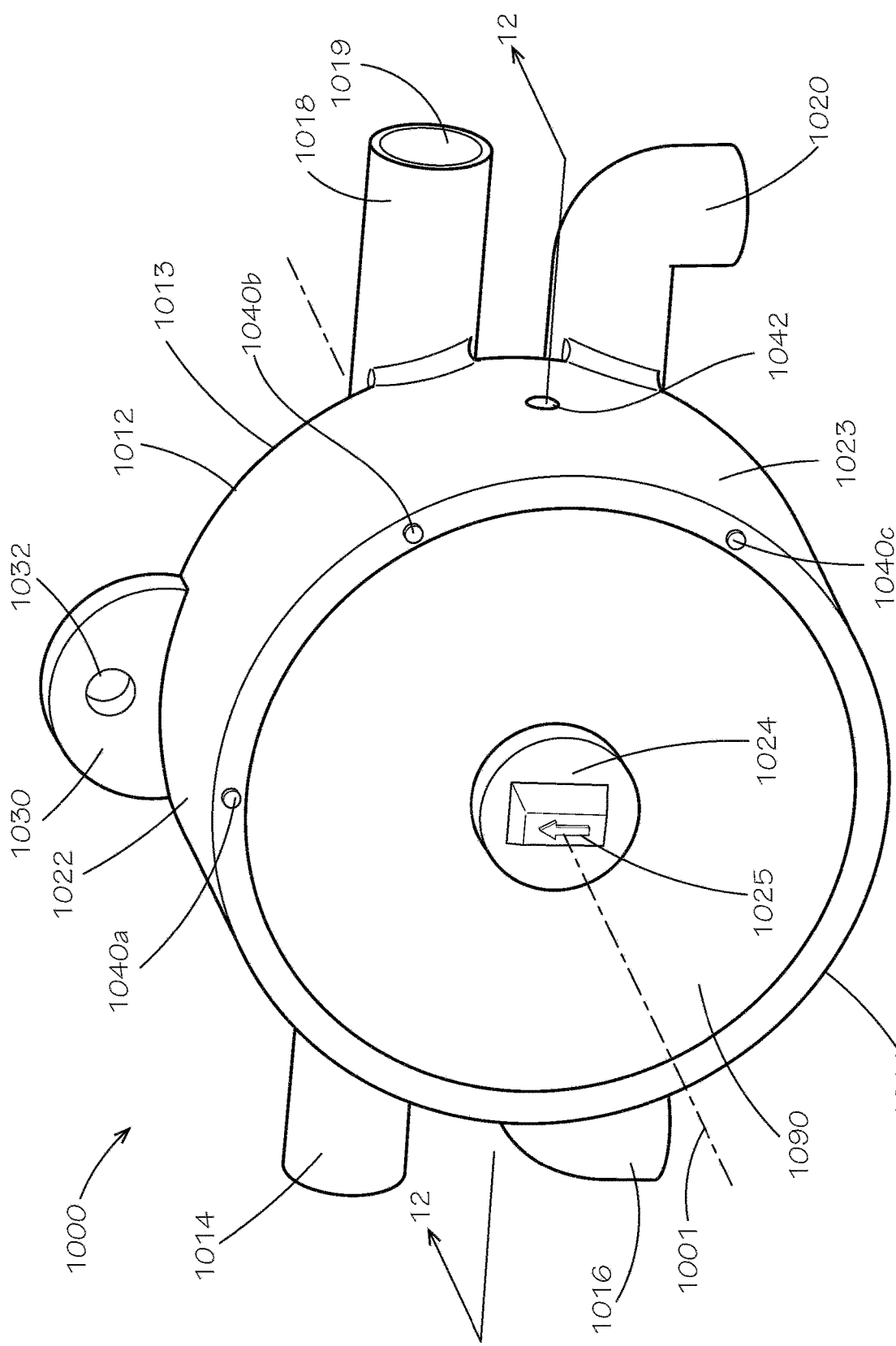
FIG. 10 is a perspective view of another aspect of a bypass valve in accordance with another aspect of the present disclosure.

FIG. 10 is a perspective view of another aspect of a bypass valve 1000 in accordance with another aspect of the present disclosure. The bypass valve 1000 can comprise a base 1012, a lid 1090, and a selector member 1024. In the present aspect, the selector member 1024 can be a selector knob 1024. The base 1012 can define an upstream utility connector 1014, a meter inlet connector 1016, a downstream utility connector 1018, and a meter outlet connector 1020, each extending outwards from a central body portion 1022 of the base 1012.

The downstream utility connector 1018 can define a downstream utility connector passage 1019 extending through the downstream utility connector 1018, and the upstream utility connector 1014 can define an upstream utility connector passage 1115 (shown in FIG. 11) extending through the upstream utility connector 1014. The meter inlet connector 1016 can define a meter inlet connector passage 1206 (shown in transparency in FIG. 12) extending through the meter inlet connector 1016, and the meter outlet connector 1020 can define a meter outlet connector passage 1210 (shown in transparency in FIG. 12) extending through the meter inlet connector 1016.

In the present aspect, the connectors 1014,1016,1018, 1020 can be hard lines. In some aspects, the connectors 1014,1016,1018,1020 can be integrally formed with the base 1012. For example and without limitation, the base 1012 can be a casting, and some or all of each connector 1014,1016, 1018,1020 can be defined by the casting. In some aspects, some or all of the connectors 1014,1016,1018,1020 can comprise one or more pipe or tubing fittings coupled to the base 1012 and/or one another to form the respective connectors 1014,1016,1018,1020. In some aspects, some or all of the connectors 1014,1016,1018,1020 can be flexible lines, and those of the connectors 1104,1016,1018,1020 that are flexible can be at least partially defined by a flexible member, such as a hose or soft tubing.

The central body portion 1022 of the base 1012 can define a perimeter surface 1023 extending around the central body portion 1022 between a front end 1011 of the central body portion 1022 and a back end 1013 of the central body portion 1022. In the present aspect, the perimeter surface 1023 can define a substantially cylindrical shape. A mounting tab 1030 can extend outwards from the perimeter surface 1023 at the back end 1013, and the mounting tab 1030 can define a mounting hole 1032. The mounting hole 1032 can receive a fastener, such as a bolt or screw, to secure the bypass valve 1000 to a structure, such as a wall for example and without limitation.

The selector knob 1024 can be rotated about a rotational axis 1001 relative to the base 1012 to re-route flow of the fluid through the bypass valve 1000. As shown and discussed in greater detail with respect to FIGS. 12-14, the bypass valve 1000 can be placed in the meter configuration (shown), the bypass configuration (as shown in FIG. 13), or the shutoff configuration (as shown in FIG. 14). Each configuration is selected by placing the selector knob 1024 in a corresponding meter position (shown), bypass position, or shutoff position, respectively.

The selector knob 1024 can define an indicator arrow 1025, which can indicate the respective position and configuration of the bypass valve 1000. The central body portion 1022 can define a plurality of position indicators 1040*a,b,c* extending axially outward from the front end 1011 relative to the rotational axis 1001, each of which corresponds to a different configuration/position. As shown in the present view, the indicator arrow 1025 is pointing upwards towards position indicator 1040*a*, which corresponds to the meter position/configuration. The selector knob 1024 can be rotated clockwise until the indicator arrow 1025 points at the position indicator 1040*b*, which can correlate to the bypass position/configuration. The selector knob 1024 can then be rotated further clockwise until the indicator arrow 1025 points at the position indicator 1040*c*, which can correlate to the shutoff position/configuration.

As discussed in greater detail below, the central body portion 1022 can define a locking aperture 1042, which can be configured to receive a locking device (not shown) that prevents unauthorized reconfiguration of the bypass valve 1000 and/or tampering by preventing rotation of certain parts within the bypass valve 1000 that are shown below in FIG. 11.

Figure 11:
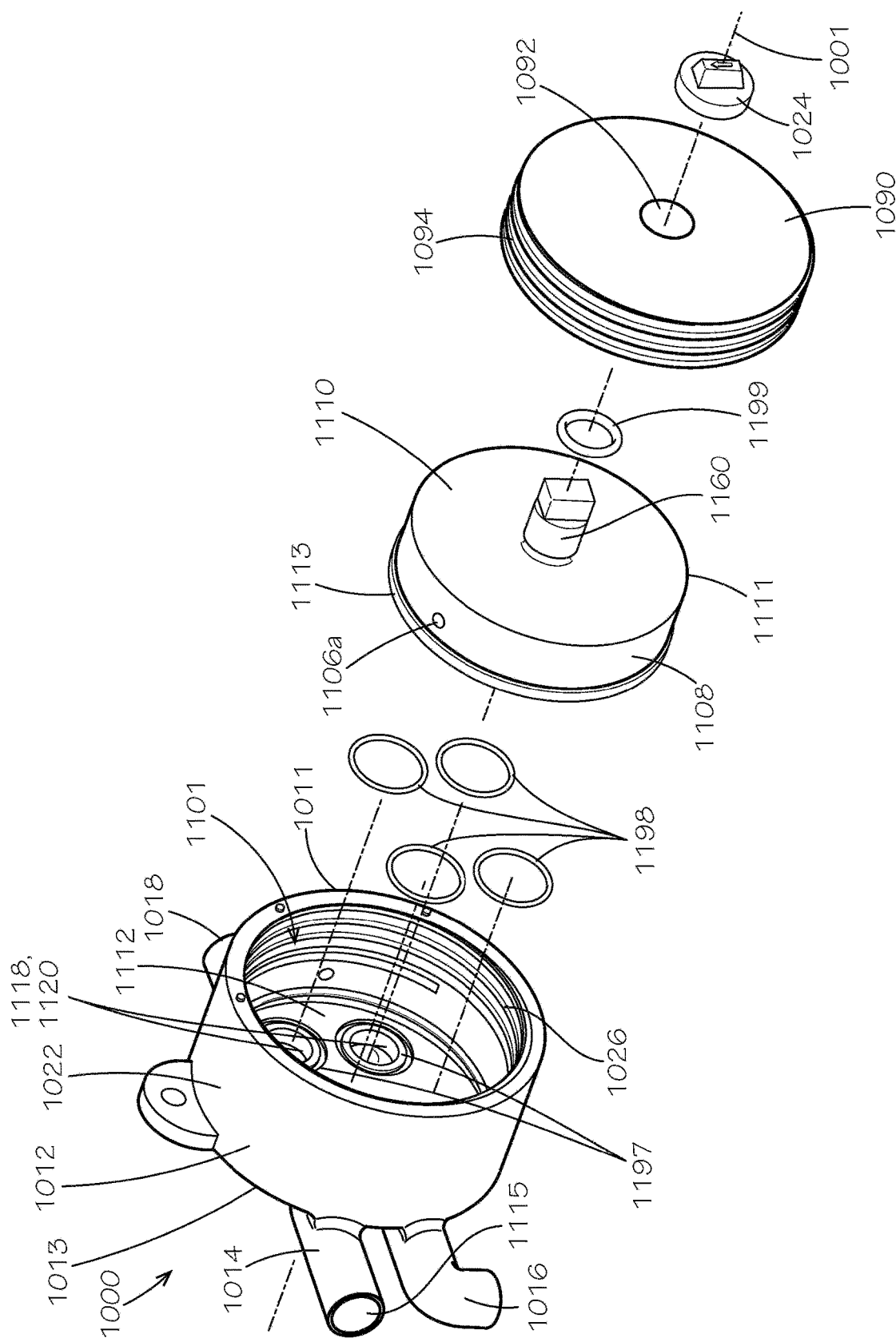
FIG. 11 is an exploded view of the bypass valve of FIG. 10.

FIG. 11 is an exploded view of the bypass valve 1000 of FIG. 10. The bypass valve 1000 is shown exploded along the rotational axis 1001. The bypass valve 1000 can comprise the base 1012, the lid 1090, the selector knob 1024, a selector 1110, a plurality of O-rings 1198, and an outer seal 1199. In the present aspect, the outer seal 1199 can be an O-ring.

The base 1012 can define a valve cavity 1101 that can extend into the central body portion 1022 from the front end 1011 to a base sealing surface 1112 that can be positioned between the front end 1011 and the back end 1013. The base sealing surface 1112 can be substantially normal to the rotational axis 1001. The central body portion 1022 can define a upstream utility bore 1214 (shown in FIG. 12), a meter inlet bore 1216 (shown in FIG. 12), a downstream utility bore 1118, and a meter outlet bore 1120, each extending into the base sealing surface 1112 and through the back end 1013 of the central body portion 1022 to respectively connect in fluid communication with the passage defined by the respective connector 1014,1016,1018,1020 (meter outlet connector 1020 shown in FIG. 10). The base sealing surface 1112 can define an O-ring groove 1197 around each of the bores 1214,1216,1118,1120 that is configured to receive a different O-ring 1198 of the plurality of O-rings 1198, as demonstrated by the bores 1118,1120.

The selector 1110 can define a front end 1111 and a back end 1113. The selector 1110 can define a circumferential surface 1108 extending between the front end 1111 and the back end 1113, and the circumferential surface 1108 can define a substantially cylindrical shape. The selector 1110 can define a plurality of locking recesses 1106*a,b,c* (locking recesses 1106*b,c*, shown in FIG. 14) extending radially into the circumferential surface 1108, relative to the rotational axis 1001.

When the bypass valve 1000 is assembled, the selector 1110 can be positioned within the valve cavity 1101 such that the O-rings 1198 each form a seal between the base sealing surface 1112 and the back end 1113 of the selector 1110, which can define a selector sealing surface (not shown). The lid 1090 can be inserted into the valve cavity 1101 to seal the selector 1110 within the valve cavity 1101. The central body portion 1022 can define internal threading 1026 within the valve cavity 1101 and positioned adjacent to the front end 1011. The internal threading 1026 can cooperate with external threading 1094 defined by the lid 1090 to secure the lid 1090 to the base 1012 and enclose the valve cavity 1101.

The selector 1110 can define a stub shaft 1160 extending outwards from the front end 1111 in an axial direction relative to the rotational axis 1001. The stub shaft 1160 can extend through a center hole 1092 defined by the lid 1090, and the outer seal 1199 can fit around the stub shaft 1160 and be positioned between the front end 1111 of the selector 1110 and the lid 1090 to seal the center hole 1092 and the valve cavity 1101. The selector knob 1024 can be mounted on the stub shaft 1160 external to the valve cavity 1101. The selector knob 1024 can be rotationally fixed to the stub shaft 1160 so that rotation of the selector knob 1024 can rotate the selector 1110 within the valve cavity 1101.

Figure 12:
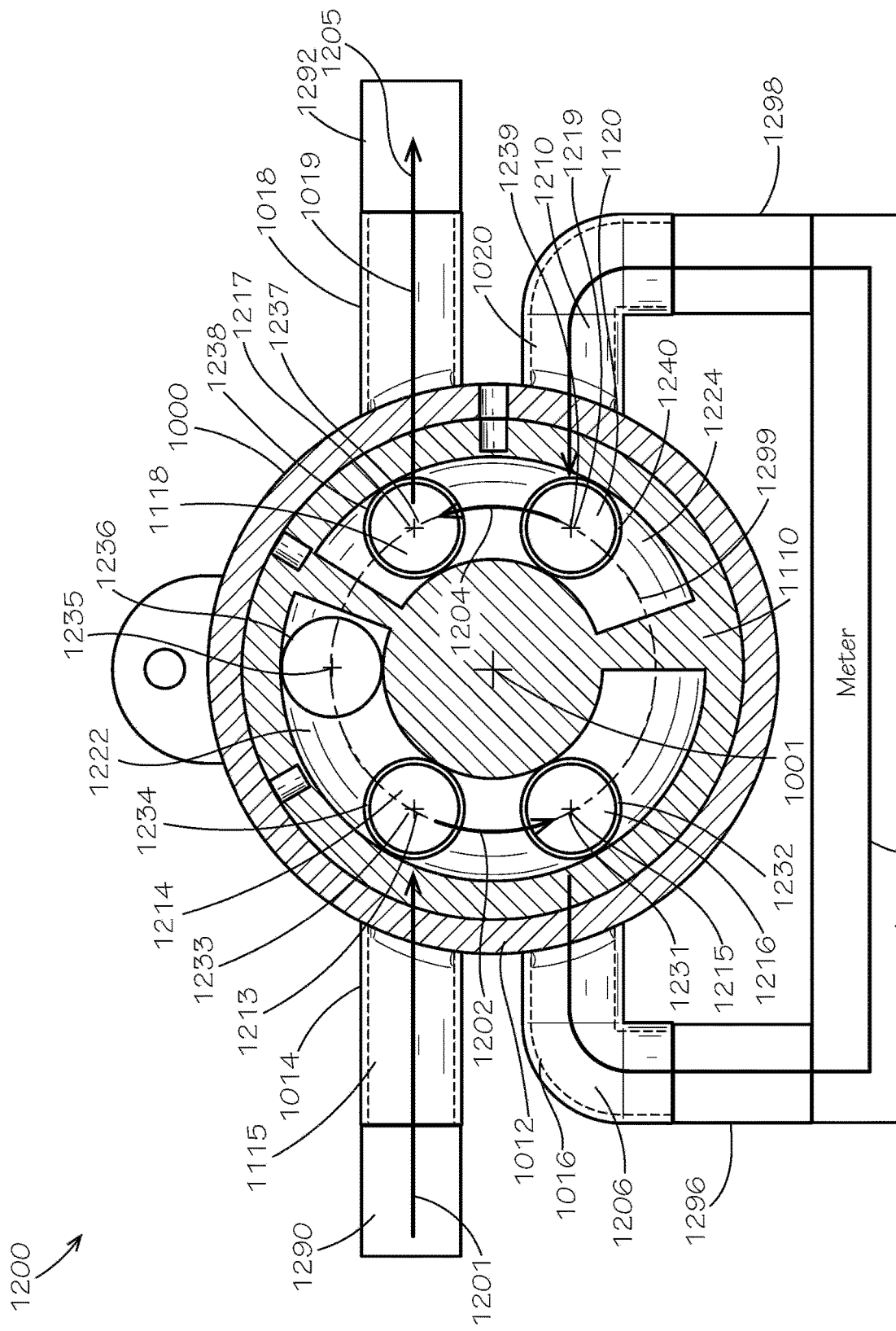
FIG. 12 is a front view of a meter utility system comprising the bypass valve of FIG. 10, with the bypass valve shown in cross-section along line 12-12 of FIG. 10 in a meter configuration in accordance with another aspect of the present disclosure.
Figure 13:
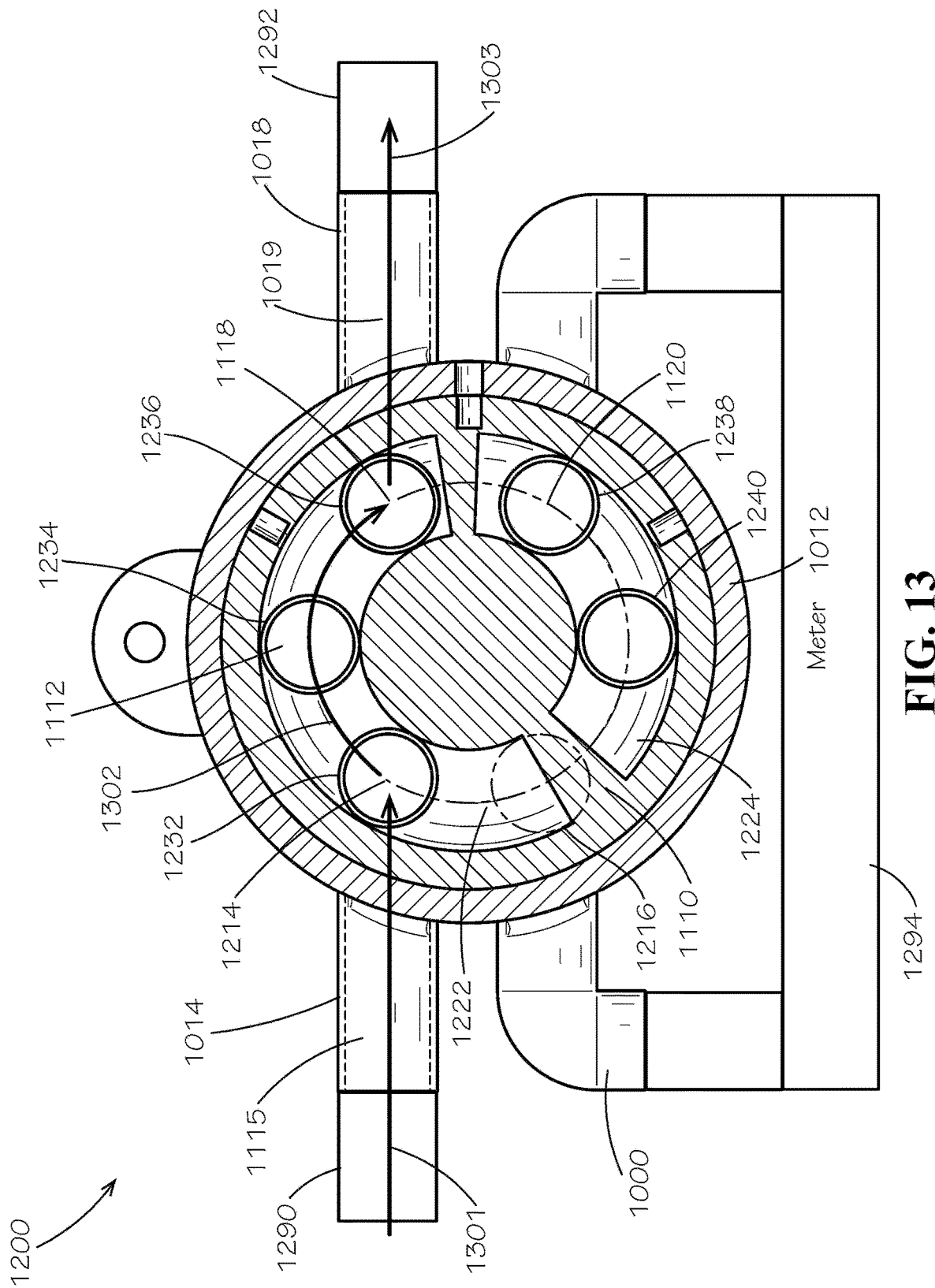
FIG. 13 is a front view of the meter utility system of FIG. 12, with the bypass valve of FIG. 10 shown in cross-section along line 12-12 of FIG. 10 in a bypass configuration.
Figure 14:
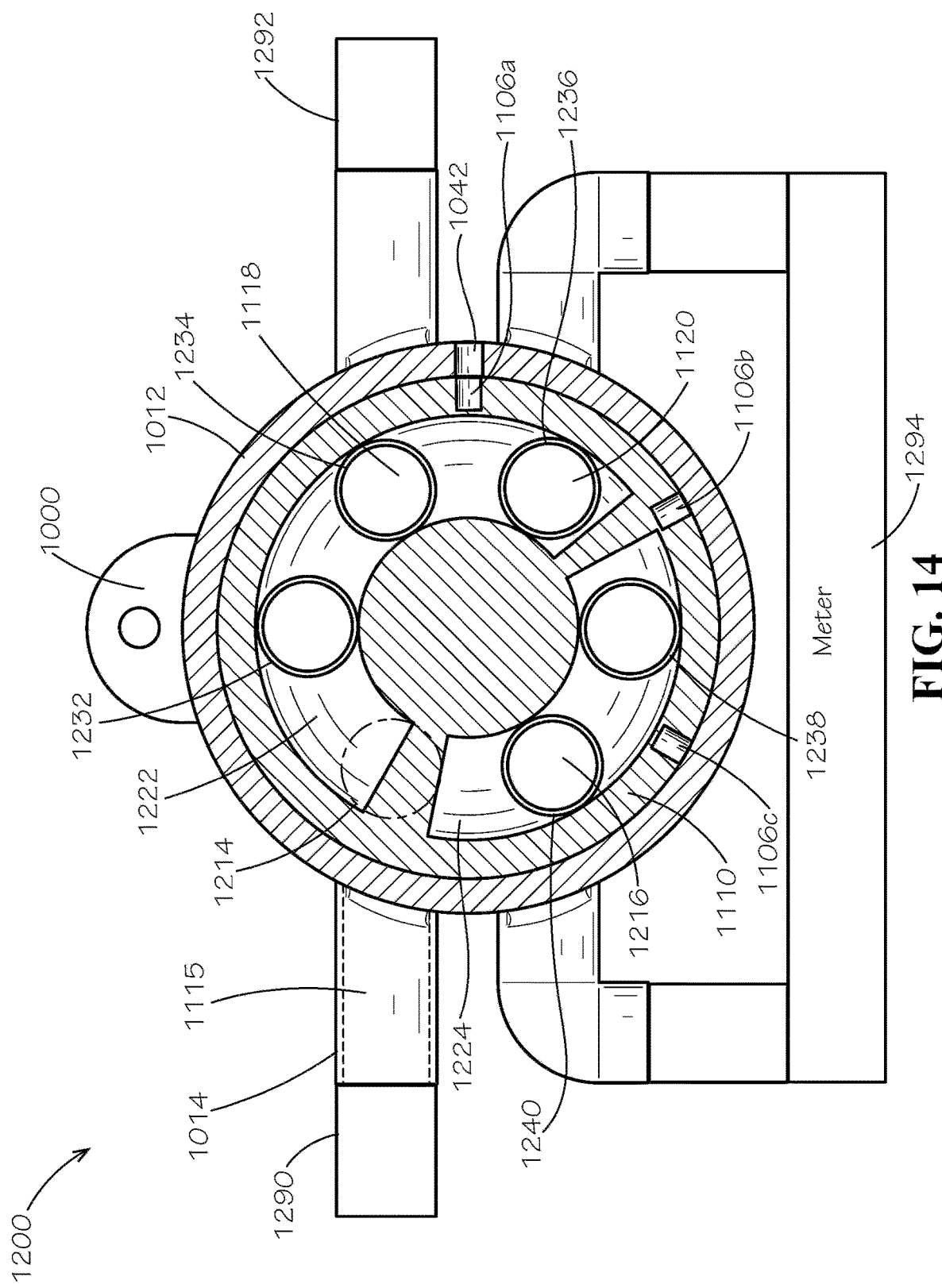
FIG. 14 is a front view of the meter utility system of FIG. 12, with the bypass valve of FIG. 10 shown in cross-section along line 12-12 of FIG. 10 in a shutoff configuration.

FIGS. 12-14 are front views of a utility metering system 1200 comprising the bypass valve 1000 of FIG. 10, shown in cross-section taken along Line 12-12 of FIG. 10, an upstream utility line 1290, a downstream utility line 1292, and a meter 1294 in accordance with another aspect of the present disclosure.

Referring to FIG. 12, the selector 1110 can define a primary passage 1222 and a secondary passage 1224 within the selector 1110 between the front end 1111 (shown in FIG. 11) and the back end 1113 (shown in FIG. 11). The selector 1110 can further define a plurality of bores 1232,1234,1236, 1238,1240 extending into a selector sealing surface (not shown) at the back end 1113 that intersect the passages 1222,1224. One distinction between the bypass valve 1000 and the bypass valve 110 (shown in FIG. 1) is that two bores 612,614 (shown in FIG. 6) can intersect the primary passage 712 (shown in FIG. 7), and three bores 616,618,620 (shown in FIG. 6) can intersect the secondary passage 714 (shown in FIG. 7) for the bypass valve 110; whereas three bores 1232,1234,1236 can intersect the primary passage 1222, and two bores 1238,1240 can intersect the secondary passage 1224 for the bypass valve 1000.

The bores 1214,1216,1118,1120 of the base 1012 can respectively define axes 1213,1215,1217,1219 (shown extending out of the page). The bores 1232,1234,1236,1238, 1240 of the selector 1110 can respectively defines axes 1231,1233,1235,1237,1239 (shown extending out of the page). The axes 1213,1215,1217,1219,1231,1233,1235, 1237,1239 can each be substantially parallel to the rotational axis 1001 (shown extending out of the page). Additionally, each of the bores 1214,1216,1118,1120,1232,1234,1236, 1238,1240 can be centered on a circular pattern 1299 centered about the rotational axis 1001, such that each of the axes 1213,1215,1217,1219,1231,1233,1235,1237,1239 can intersect the circular pattern 1299. Additionally, when bores 1214,1216,1118,1120 of the base 1012 align and seal with bores 1232,1234,1236,1238,1240 of the selector 1110, the respective axes can be coaxial with one another as shown.

In FIG. 12, the bypass valve 1000 can be in the meter configuration, and the selector 1110 can be in the corresponding meter position. A flow of the fluid is shown through the utility metering system 1200 in the meter configuration by the flow arrows 1201,1202,1203,1204, 1205. The flow arrow 1201 shows that the fluid can pass from the upstream utility line 1290 to the upstream utility connector 1014, through the upstream utility connector passage 1115 (shown in transparency) to the upstream utility bore 1214. The fluid can then flow from the upstream utility bore 1214 into the primary passage 1222 through the primary passage bore 1234. Flow arrow 1202 shows that the fluid can then pass through the primary passage 1222 from the primary passage bore 1234 to the primary passage bore 1232, where the fluid can pass into the meter inlet bore 1216. Next, flow arrow 1203 shows that the fluid can pass through the meter inlet connector passage 1206 (shown in transparency) of the meter inlet connector 1016 to an inlet 1296 of the meter 1294, then through the meter 1294 to an outlet 1298 of the meter 1294, then through the meter outlet connector passage 1210 (shown in transparency) of the meter outlet connector 1020 to the meter outlet bore 1120. The fluid can enter the secondary passage 1224 from the meter outlet bore 1120 through the secondary passage bore 1240, where the fluid can then flow to secondary passage bore 1238, and into the downstream utility bore 1118, as shown by flow arrow 1204. From the downstream utility bore 1118, the fluid can then flow through the downstream utility connector passage 1019 (shown in transparency) of the downstream utility connector 1018 to the downstream utility line 1292, as shown by flow arrow 1205.

When the fluid passes through the meter 1294, the meter 1294 can take measurements of one or more parameters related to the fluid, the flow of the fluid, or both, and values of the parameter(s) can be recorded. For example and without limitation, the meter 1294 can measure and record a flowrate of the fluid, such as a volumetric flowrate, and an aggregate flow through the meter 1294 over a designated time period can also be recorded.

By rotating the selector knob 1024 (shown in FIG. 10) clockwise sixty degrees, the bypass valve 1000 can be placed in the bypass configuration, with the selector 1110 placed in the corresponding bypass position, as shown in FIG. 13.

In the FIG. 13, the bypass valve 1000 is in the bypass configuration, and the selector 1110 is in the corresponding bypass position. In the bypass position, the primary passage bore 1232 can align with and connect in fluid communication with the upstream utility bore 1214, and the primary passage bore 1236 can align with and connect in fluid communication with the downstream utility bore 1118. In the present aspect, the primary passage bore 1234 may not be sealed by the base sealing surface 1112. Instead, because of the sealed nature of the valve cavity 1101 (shown in FIG. 11) provided by the outer seal 1199 (shown in FIG. 11), some fluid can be allowed to leak between the selector 1110 and the base 1012, to the point where pressure equalizes and fluid no longer flows to this space.

A flow of the fluid is shown through the utility metering system 1200 in the bypass configuration by the flow arrows 1301,1302,1303. The flow arrow 1301 shows that the fluid can pass from the upstream utility line 1290 to the upstream utility connector 1014, through the upstream utility connector passage 1115 (shown in transparency) to the upstream utility bore 1214. The fluid can then flow from the upstream utility bore 1214 into the primary passage 1222 through primary passage bore 1232. Flow arrow 1302 then shows that the fluid can pass through the primary passage 1222 to primary passage bore 1236, by passing over primary passage bore 1234. From the primary passage bore 1236, the fluid can then flow into the downstream utility bore 1118 and through the downstream utility connector passage 1019 (shown in transparency) of the downstream utility connector 1018 to the downstream utility line 1292, as shown by flow arrow 1303. In the bypass configuration, no fluid flows through the secondary passage 1224, and the meter 1294 can be bypassed so that no fluid passes through the meter 1294. In other words, the primary passage 1222 can directly connect the upstream utility connector 1014 in fluid communication with the downstream utility connector 1018 in the bypass configuration/position.

In the bypass configuration, the fluid may not flow through the secondary passage 1224. As shown, the secondary passage bore 1240 is not aligned or connected in fluid communication with any of the bores 1214,1216,1118,1120 (meter inlet bore 1216 shown in transparency). The secondary passage bore 1238 can align and connect in fluid communication with the meter outlet bore 1120; however, no fluid flows through the meter 1294. The meter inlet bore 1216 (shown in transparency) can seal with the selector sealing surface (not shown) at the back end 1113 (shown in FIG. 11) of the selector 1110, which effectively acts as a blind surface to prevent flow through the meter inlet bore 1216.

By rotating the selector knob 1024 (shown in FIG. 10) clockwise sixty degrees, the bypass valve 1000 can be placed in the shutoff configuration, with the selector 1110 placed in the corresponding shutoff position, as shown in FIG. 14.

Operation of the bypass valve 1000 in the shutoff configuration can differ slightly from the operation of the bypass valve 110 of FIG. 1 in the shutoff configuration, discussed with respect to FIG. 9. Referring to FIG. 9, the bypass valve 110 can permit the fluid to enter the primary passage 712 through alignment and fluid connection of the upstream utility bore 314 with primary passage bore 612, and the flow of fluid through the bypass valve 110 can be prevented by the blind face 322, which seals with and blocks primary passage bore 614. Returning to FIG. 14, in the shutoff configuration, fluid cannot enter either the primary passage 1222 or the secondary passage 1224. Instead, the upstream utility bore 1214 (shown in transparency) can be blocked and sealed by the selector sealing surface (not shown) at the back end 1113 (shown in FIG. 11) of the selector 1110. Accordingly, because none of the bores 1232,1234,1236,1238,1240 align with the upstream utility bore 1214, the fluid cannot enter the selector 1110 nor pass through the bypass valve 1000 to the meter 1294 or the downstream utility line 1292.

For reference, in the shutoff configuration, secondary passage bore 1240 can align and connect in fluid communication with the meter inlet bore 1216. The primary passage bore 1236 can align with and connect in fluid communication with meter outlet bore 1120. The primary passage bore 1234 can align and connect in fluid communication with the downstream utility bore 1118.

As referenced above with respect to FIG. 11, the selector 1110 can define the plurality of locking recesses 1106a,b,c. These locking recesses 1106a,b,c can align with the locking aperture 1042, defined by the base 1012, in the shutoff configuration/position, the bypass configuration/position, and the meter configuration/position, respectively. A locking mechanism (not shown), can be inserted into the respective locking recess 1106a,b,c through the locking aperture 1042 to lock the bypass valve 1000 in that configuration. For example, the locking aperture 1042 can be threaded, and a screw, such as a set screw, with a proprietary head shape could be screwed into the locking aperture 1042 and into one of the locking recesses 1106a,b,c to lock the bypass valve 1000. As shown, engaging locking recess 1106a through the locking aperture 1042 can lock the bypass valve 1000 in the shutoff configuration. Engaging locking recess 1106b through the locking aperture 1042 can lock the bypass valve 1000 in the bypass configuration. Engaging locking recess 1106c through the locking aperture 1042 can lock the bypass valve 1100 in the meter configuration.

The bypass valve 110,1000 can facilitate service of meters 194,1294 by allowing a utility company to service or replace the meter 194,1294 without substantially disrupting flow of the fluid to a point off consumption connected to the downstream utility line 192,1292. For example and without limitation, the upstream utility line 190,1290 can be a branch line off a utility main, and the downstream utility line 192,1292 can connect to a home, place of business, or other establishment. In normal operation, the bypass valve 110, 1000 can operate in the meter configuration, wherein fluid can flow through the meter 194,1294, and the meter 194, 1294 can track consumption of the fluid by the respective utility customer. If, for example, the meter 194,1294 needs to be replaced or taken out of service for repair, the bypass valve 110,1000 can be switched to the bypass configuration, which allows the fluid to continue to flow to the point of consumption/customer with only a momentary disruption in flow as the selector 510,1110 is rotated. The meter 194,1294 can then be serviced/replaced as needed, and once the meter 194,1294 is operational again, the bypass valve 110,1000 can be switched back to the meter configuration to resume monitoring the consumption of the fluid. If utility service to the point of consumption/customer needs to be discontinued, such as because of unpaid bills or the customer abandoning the premises, the bypass valve 110,1000 can be placed in the shutoff configuration to stop the flow of fluid to the point of consumption/customer.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A bypass valve comprising:
a base defining a base sealing surface, the base defining a upstream utility bore, a downstream utility bore, a meter inlet bore, and a meter outlet bore each extending into the base sealing surface; and
a selector defining a selector sealing surface positioned in sealing engagement with the base sealing surface, the selector defining a primary passage and a secondary passage, the selector defining at least one primary passage bore extending into the selector sealing surface and connecting in fluid communication with the primary passage, the selector defining at least one secondary passage bore extending into the selector sealing surface and connecting in fluid communication with the secondary passage, the selector being rotatable relative to the base about and between a meter position and a bypass position, the selector connecting the upstream utility bore in fluid communication with the meter inlet bore in the meter position, the selector connecting the upstream utility bore in fluid communication with the downstream utility bore in the bypass position.

2. The bypass valve of claim 1, wherein:
the base defines a front end and a back end;
a valve cavity extends into the front end of the base to the base sealing surface;
the base sealing surface is positioned between the front end and the back end; and
the selector is positioned within the valve cavity with the selector sealing surface facing the base sealing surface.

3. The bypass valve of claim 2, further comprising an outer O-ring extending circumferentially around the selector, the outer O-ring forming a seal with a sidewall sealing surface of the base, the sidewall sealing surface extending between the front end and the base sealing surface.

4. The bypass valve of claim 1, wherein:
the selector is rotatable relative to the base about a rotational axis; and
the upstream utility bore defines an axis positioned parallel to the rotational axis.

5. The bypass valve of claim 4, wherein:
the at least one primary passage bore defines an axis positioned parallel to the rotational axis; and
the at least one secondary passage bore defines an axis positioned parallel to the rotational axis.

6. The bypass valve of claim 1, further comprising an O-ring positioned around the upstream utility bore and between the base sealing surface and the selector sealing surface, the O-ring selectively sealing the upstream utility bore in fluid communication with the at least one primary passage bore or the at least one secondary passage bore.

7. The bypass valve of claim 1, wherein:
the primary passage connects the upstream utility bore in fluid communication with the meter inlet bore in the meter position;
the secondary passage connects the downstream utility bore in fluid communication with the meter outlet bore in the meter position; and
the secondary passage connects the upstream utility bore in fluid communication with the downstream utility bore in the bypass position.

8. A utility metering system comprising:
an upstream utility line;
a downstream utility line;
a meter comprising a meter inlet and a meter outlet, the meter configured to measure a fluid flow through the meter; and
a bypass valve comprising:
a base defining a base sealing surface, the base defining a upstream utility bore, a downstream utility bore, a meter inlet bore, and a meter outlet bore each extending into the base sealing surface, the upstream utility bore connected in fluid communication with the upstream utility line, the downstream utility bore connected in fluid communication with the downstream utility line, the meter inlet bore connected in fluid communication with the meter inlet, the meter outlet bore connected in fluid communication with the meter outlet; and
a selector defining a selector sealing surface positioned in sealing engagement with the base sealing surface, the selector defining a primary passage and a secondary passage, the selector defining at least one primary passage bore extending into the selector sealing surface and connecting in fluid communication with the primary passage, the selector defining at least one secondary passage bore extending into the selector sealing surface and connecting in fluid communication with the secondary passage, the selector being rotatable relative to the base about and between a meter position and a bypass position, the selector connecting the upstream utility bore in fluid communication with the meter inlet bore in the meter position, the selector connecting the upstream utility bore in fluid communication with the downstream utility bore in the bypass position.

9. The utility metering system of claim 8, wherein:
the primary passage connects the upstream utility bore in fluid communication with the meter inlet bore in the meter position;
the secondary passage connects the downstream utility bore in fluid communication with the meter outlet bore in the meter position; and
the secondary passage connects the upstream utility bore in fluid communication with the downstream utility bore in the bypass position.

10. The utility metering system of claim 8, wherein the at least one primary passage bore comprises two primary passage bores, and wherein the at least one secondary passage bore comprises three secondary passage bores.

11. The utility metering system of claim 8, wherein:
the selector is rotatable relative to the base about a rotational axis; and
the upstream utility bore defines an axis positioned parallel to the rotational axis.

12. The utility metering system of claim 11, wherein:
the at least one primary passage bore defines an axis positioned parallel to the rotational axis; and
the at least one secondary passage bore defines an axis positioned parallel to the rotational axis.

13. The utility metering system of claim 8, wherein the selector sealing surface is planar, and wherein the base sealing surface is parallel to the selector sealing surface.

14. The utility metering system of claim 8, wherein a continuous fluid path is formed when the selector is in the metering position which extends:
from the upstream utility line through the upstream utility bore to the primary passage;
through the primary passage from the upstream utility bore to the meter inlet bore;
from the meter inlet bore to the meter inlet;
through the meter from the meter inlet to the meter outlet;
from the meter outlet to the meter outlet bore;
from the meter outlet bore through the secondary passage to the downstream utility bore; and
from the downstream utility bore to the downstream utility line.

15. A method for routing a fluid flow through a utility metering system comprising:
positioning a selector of a bypass valve in a metering position, an upstream utility line of the utility metering system connected in fluid communication with an upstream utility bore defined by a base of the bypass valve, a downstream utility line of the utility metering system connected in fluid communication with a downstream utility bore defined by the base, a meter inlet of a meter of the utility metering system connected in fluid communication with a meter inlet bore defined by the base, a meter outlet of the meter of the utility metering system connected in fluid communication with a meter outlet bore defined by the base, the selector defining a primary passage and a secondary passage, the primary passage connecting the upstream utility bore in fluid communication with the meter inlet bore in the metering position, the secondary passage connecting the downstream utility bore in fluid communication with the meter outlet bore in the metering position, a fluid flow passing from the upstream utility line through the meter to the downstream utility line in the metering position; and rotating the selector relative to the base to position the selector in a bypass position, the secondary passage connecting the upstream utility bore in fluid communication with the downstream utility bore in the bypass position, the fluid flow passing from the upstream utility bore to the downstream utility bore and bypassing the meter in the bypass position.

16. The method of claim 15, wherein rotating the selector relative to the base to position the selector in the bypass position comprises rotating the selector about a rotational axis, and wherein the upstream utility bore defines an axis positioned parallel to the rotational axis.

17. The method of claim 15, further comprising rotating the selector relative to the base to position the selector in a shutoff position, the bypass valve blocking the fluid flow of the upstream utility bore from reaching the meter and the downstream utility bore in the shutoff position.

18. The method of claim 15, wherein:

the base defines a base sealing surface;

the upstream utility bore, the downstream utility bore, the meter inlet bore, and the meter outlet bore each extend into the base sealing surface;

the selector defines a selector sealing surface;

the selector defines at least one primary passage bore extending into the selector sealing surface and connecting in fluid communication with the primary passage;

the selector defines at least one secondary passage bore extending into the selector sealing surface and connecting in fluid communication with the secondary passage; and the base sealing surface is positioned in sealing engagement with the selector sealing surface.

19. The method of claim 18, wherein the selector sealing surface is planar, and wherein the base sealing surface is parallel to the selector sealing surface.

20. The method of claim 18, wherein an O-ring extends around the upstream utility bore, and wherein the O-ring forms a seal between the base sealing surface and the selector sealing surface.

21. The method of claim 15, further comprising removing the meter from the bypass valve with the selector in the bypass position.

\* \* \* \* \*